United States Patent
McMurray

(10) Patent No.: US 11,301,110 B2
(45) Date of Patent: Apr. 12, 2022

(54) PULL LOCOMOTION IN A VIRTUAL REALITY ENVIRONMENT

(71) Applicant: Home Box Office, Inc., New York, NY (US)

(72) Inventor: Robert McMurray, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 16/426,201

(22) Filed: May 30, 2019

(65) Prior Publication Data

US 2020/0210050 A1 Jul. 2, 2020

Related U.S. Application Data

(60) Provisional application No. 62/785,531, filed on Dec. 27, 2018.

(51) Int. Cl.
*G06F 3/048* (2013.01)
*G06F 3/01* (2006.01)
(Continued)

(52) U.S. Cl.
CPC .......... *G06F 3/04815* (2013.01); *A63F 13/57* (2014.09); *G06F 3/011* (2013.01); *A63F 2300/8082* (2013.01)

(58) Field of Classification Search
CPC .... G06F 3/04815; G06F 3/011; G06F 3/0482; A63F 13/57
See application file for complete search history.

(56) References Cited

U.S. PATENT DOCUMENTS 7,119,819 B1 * 10/2006 Robertson ........... G06F 3/04815
715/782
7,542,040 B2 * 6/2009 Templeman ............ G06F 3/011
345/474
(Continued)

FOREIGN PATENT DOCUMENTS

EP 3 321 777 A1 5/2018
WO 2016/168047 A1 10/2016

OTHER PUBLICATIONS

Cloudhead Games—Blink Teleportation (VR Locomotion); https://www.youtube.com/watch?v=DwZt2jRE8PY; English Transcript 1:4-2:43 (Year: 2015).*

(Continued)

*Primary Examiner* — Nicholas Augustine
(74) *Attorney, Agent, or Firm* — Amin, Turocy & Watson, LLP

(57) ABSTRACT

The described technology is generally directed towards pull locomotion, which allows users to move around a virtual reality environment (typically larger than their physical environment) by interacting with pull targets, which comprise interactive objects displayed in the reality environment. When (e.g., via a controller) the user reaches grabs a pull target and pulls the controller back towards the user, the user's perceived position moves toward the target, as if the environment is being pulled to the user. A push motion generally results in moving the user's perceived position away from the target. The perceived movement can be gradual in the environment, relative to the speed of the pull or push. The pulling and pushing facilitate an interactive narrative experience or enhance interactive game play.

20 Claims, 21 Drawing Sheets

(51) Int. Cl.
*G06F 3/04815* (2022.01)
*A63F 13/57* (2014.01)

(56) References Cited

U.S. PATENT DOCUMENTS

| | | | | |
|---|---|---|---|---|
| 8,678,922 | B2* | 3/2014 | Ealey | A63F 13/005 |
| | | | | 463/31 |
| 9,696,795 | B2* | 7/2017 | Marcolina | G06F 3/017 |
| 9,996,797 | B1* | 6/2018 | Holz | G06F 3/04842 |
| 10,242,032 | B2* | 3/2019 | Sundaresan | G06F 3/04815 |
| 10,338,687 | B2* | 7/2019 | Glazier | G06F 3/0346 |
| 10,593,105 | B2* | 3/2020 | Singh | G06F 3/011 |
| 11,010,972 | B2* | 5/2021 | Wiley | G06T 19/006 |
| 2015/0169076 | A1* | 6/2015 | Cohen | G06F 3/0304 |
| | | | | 345/156 |
| 2016/0257000 | A1* | 9/2016 | Guerin | B25J 9/1605 |
| 2017/0185261 | A1* | 6/2017 | Perez | G06F 3/04815 |
| 2018/0224945 | A1* | 8/2018 | Hardie-Bick | G06F 3/04815 |
| 2019/0066387 | A1* | 2/2019 | Grossmann | G06F 3/017 |
| 2019/0133689 | A1* | 5/2019 | Johnson | G09B 9/00 |
| 2020/0294312 | A1* | 9/2020 | Ziman | G06F 3/011 |

OTHER PUBLICATIONS

International Search Report and Written Opinion received for PCT Application Serial No. PCT/US2019/068165 dated Feb. 27, 2020, 16 pages.

Kulik et al., "Building on Realism and Magic for Designing 3D Interaction Techniques" DOI: 10.1109/MCG.2009.115, Nov. 1, 2009, 22 pages.

Hayden, Scott., "Hands-on: Crytek's 'The Climb' with Oculus Touch Feels Like an Entirely New Experience", Road to VR, URL:https:///www.roadtovr.com/crytek-the-climb-oculus-touch-feels-like-an-entirely-new-experience/, Aug. 18, 2016, 3 pages.

Communication pursuant to Rules 161(1) and 162 EPC for EP Application No. 19842519.1 dated Aug. 3, 2021.

International Preliminary Report on Patentability for International Application No. PCT/US2019/068165 dated Jul. 8, 2021.

* cited by examiner

PULL LOCOMOTION IN A VIRTUAL REALITY ENVIRONMENT

CROSS-REFERENCE TO RELATED APPLICATION

This application is a non-provisional of U.S. Provisional Patent Application No. 62/785,531, filed on Dec. 27, 2018 entitled "PULL LOCOMOTION IN A VIRTUAL REALITY ENVIRONMENT." The entirety of the aforementioned application is hereby incorporated herein by reference.

BACKGROUND

Most virtual reality locomotion uses the teleportation method, in which a user casts an arc (e.g., moves a line ending at a point) to a location in a virtual reality environment by holding a button on a virtual reality controller. When the user releases the button, the user is immediately transported to the location marked by the end of the arc, usually with a camera fade or the like (often called "blink"). While this works and helps users avoid motion sickness, teleportation is basically instant, whereby the user never experiences motion and has a distorted sense of time while teleporting, unless a time slowdown effect is used. Another locomotion method uses grabbing and pushing to navigate an environment, but in general is only suitable for zero gravity simulations.

At present, providing fast, comfortable, and immersive locomotion is one of the primary challenges for virtual reality creators. There are a number of different locomotion methods, but none of them do this favorably.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
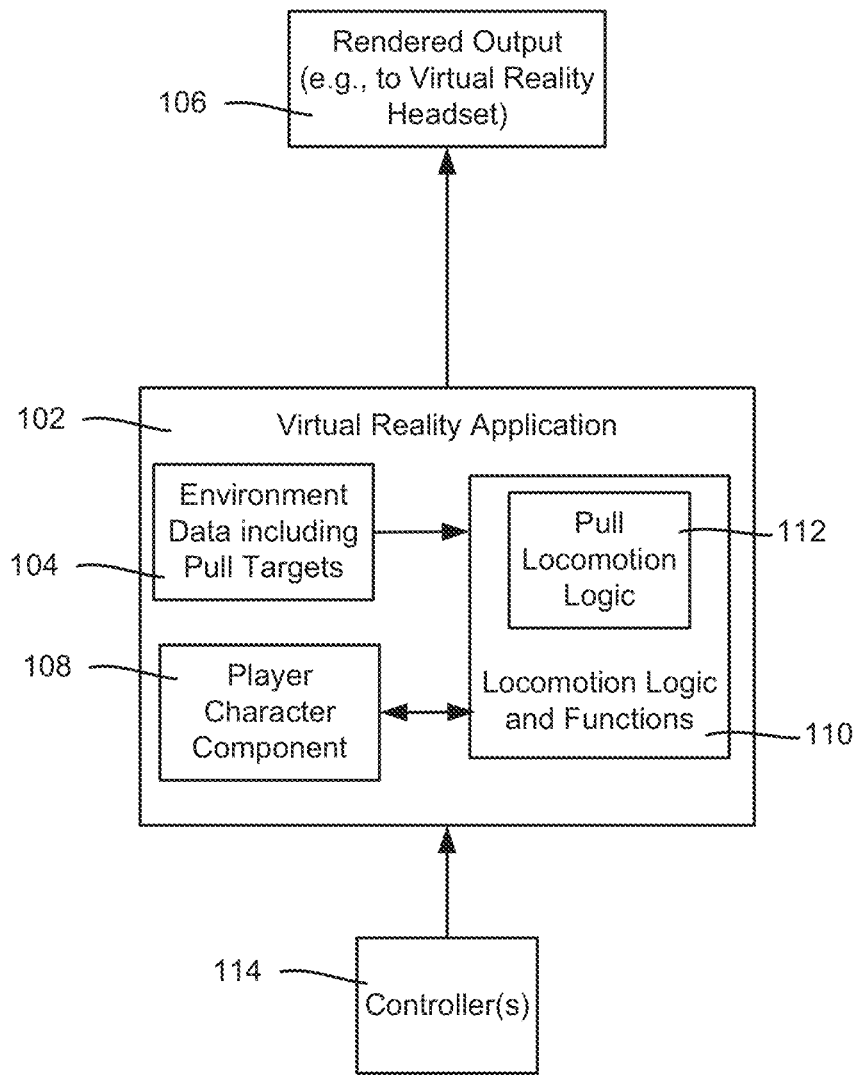
FIG. 1 is a block diagram showing components that can be used to facilitate pull locomotion in a virtual reality environment, in accordance with various aspects and embodiments of the subject disclosure.

Described herein is a technology for locomotion in a virtual reality environment, referred to as "pull locomotion." In general, pull locomotion allows a user to move around a virtual reality environment, which in general is larger than his or her physical environment. For example, a virtual reality environment can be an entire immersive world, but the physical environment in which the user is actually using a virtual reality headset and controller can be a small room, or even part of a room.

Note that one use of the pull locomotion technology described herein is for an interactive narrative experience; however the pull locomotion technology described herein can be used in any virtual reality application, particularly with one or more controllers. For example, interactive game play is another usage scenario.

In one or more implementations, the virtual reality environment in which a user is moving contains "Pull Targets," comprising virtually rendered objects that respond when the user reaches one of the user's virtual reality hand controllers, for example, toward that target. While reaching toward the target, the user may hold down a "grab" button on the controller, and pull the controller toward himself or herself. The user travels toward or away from the target relative to the motion of their hand toward or away from the user's body.

Pull locomotion is different from an object grab component in virtual reality, in that in contrast to rapidly bringing grabbed objects to the user, with pull locomotion the user brings himself or herself to locations. The Pull Target objects function as grab handles in the environment, as if the environment could be pulled to (and pushed away from) the user.

It should be understood that any of the examples, implementations and/or embodiments described herein are non-limiting. For example, one implementation of pull locomotion draws on the UNREAL ENGINE authoring environment, and thus some engine-provided components are capitalized herein, such as Motion Controller Component, Scene Component, Player Character, Capsule Component, Spline Component, Player Pawn, and Actor, for example. A Pull Locomotion Component as described herein, although not an engine-provided component, can follow similar component naming conventions. Notwithstanding, it is understood that such capitalization is for consistency, and is not to be interpreted as limiting any component(s) to any particular authoring environment, engine or the like. Moreover, it is understood that the examples herein are only one possible implementation, and that alternative implementations can use other components, authoring environments and so forth. As such, any of the embodiments, aspects, concepts, structures, functionalities or examples described herein are non-limiting, and the technology may be used in various ways that provide benefits and advantages in computing and/or virtual reality in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

FIG. 1 shows example components that can be implemented in a virtual reality application program 102 or the like. In general, the virtual reality application program 102 comprises environment data 104 for rendering an environment, including with Pull Targets as described herein, on a virtual reality headset 106 or the like.

Also shown in FIG. 1 is a Player Character component 108, and locomotion logic and functions 110, which include Pull Locomotion logic 112 as described herein. In general, a user uses a hand controller 114 or the like to move above the virtual reality environment, with the arm and hand movements causing re-rendered output based on the user interaction. In general, the object data of the controller(s) 114 comprises spatial positioning data, heading data, and input detection, which is provided to the other logic/components. In one implementation, the Pull Locomotion logic can be built using UNREAL ENGINE BLUEPRINT node-based programming logic.

Turning to aspects of Pull Locomotion logic, in one implementation, the logic can be included in or otherwise couple to a Scene Component that is then attached to a Motion Controller Component. The Motion Controller Component can be a child of the Player Character 108 used to represent the player in virtual reality. Hierarchically, the components under the character blueprint can comprise a Player Character comprising a Capsule Component (e.g., inherited) for collisions/sitting on the ground correctly and a camera. The Motion Controller Component, e.g., part of the Pull Locomotion logic 112, can comprise a Pull Locomotion Component and a Spline Component.

More particularly, in an implementation in which the Pull Locomotion Component does not spawn its own components, the Pull Locomotion Component can use a Spline Component; e.g., the Pull Locomotion Component can rely on a reference to a Spline Component (which may or may not be directly attached by default). The Spline Component can be used to store multi-point paths provided by a navigation mesh (navmesh) system, so that the path traveled by a Player Character can have multiple points and route around obstacles rather than moving straight through them.

Figure 2:
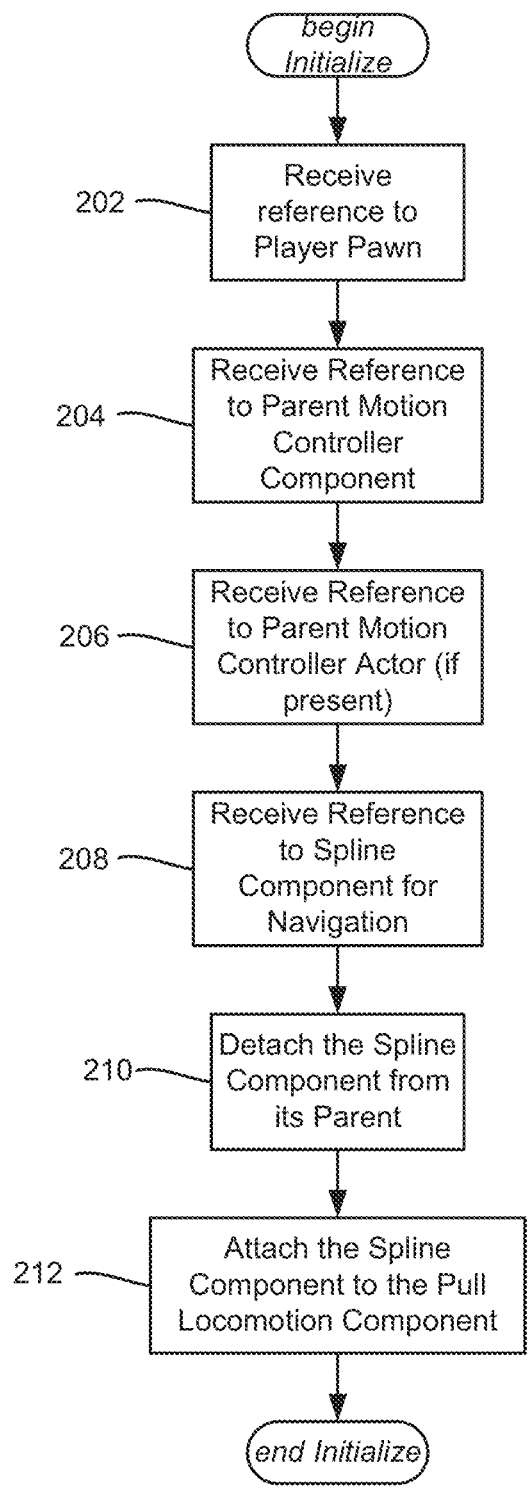
FIG. 2 illustrates an example flow diagram showing example initialization-related operations, in accordance with various aspects and embodiments of the subject disclosure.
Figure 3:
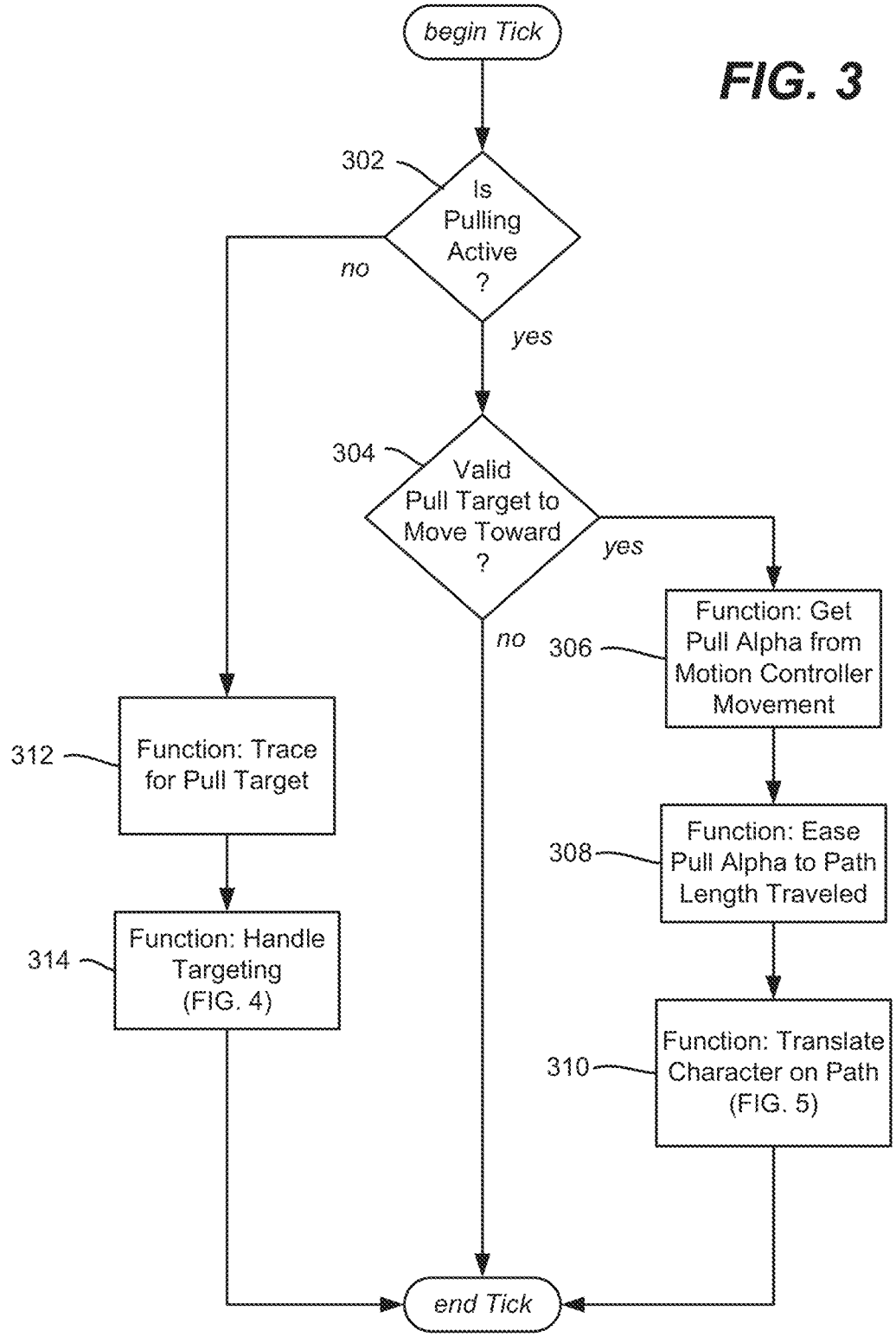
FIG. 3 is an example flow diagram showing example logic operations when pull locomotion (pulling) is active or is inactive, in accordance with various aspects and embodiments of the subject disclosure.
Figure 4:
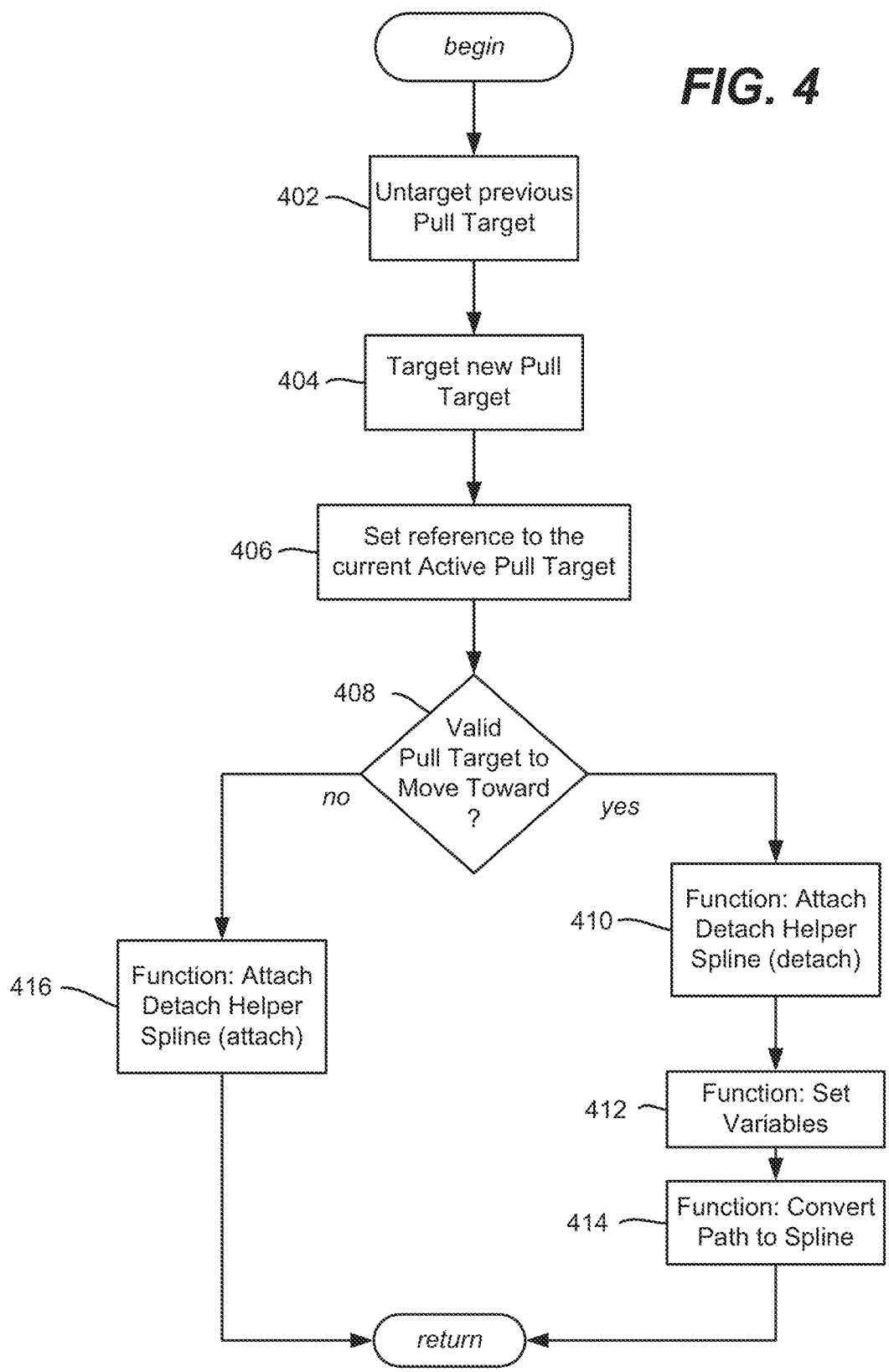
FIG. 4 is an example flow diagram showing example logic operations following a handle targeting function, in accordance with various aspects and embodiments of the subject disclosure.

As shown in FIG. 2, the Pull Locomotion Component can initialize (e.g., initialization runs once, such as called from the component's parent Actor), and thereby receive references to a Player Pawn (operation 202), a parent Motion Controller Component (operation 204), a parent motion controller Actor (if present, operation 206) and the Spline Component for navigation (operation 208). As shown via operations 210 and 212, the Spline Component can be detached from its parent, and can be attached to the pull locomotion component Once initialized, an event tick process (e.g., which runs every frame) evaluates whether pulling is active, as shown via operation 302 of FIG. 3. Activation is typically set by holding the grab button on the motion controller; that is, held equals active, released equals inactive. As shown in FIG. 3, the Pull Locomotion logic operates via the following operations based on whether pulling is active (operation 302):

Yes, Pulling is Active
  Operation 304—Is there a valid Pull Target to move toward?
    Yes, there is a valid Pull Target, call the following functions ("F:") (described below)
      F: Get Pull Alpha from Motion Controller Movement (operation 306)
      F: Ease Pull Alpha to Path Length Traveled (operation 308)
      F: Translate Character on Path (operation 310, with additional details described with reference to FIG. 5)
    No, there is not a valid Pull Target to move toward as determined via operation 304
      Do nothing (end)
No, Pulling is not Active, call the following functions (described below)
  F: Trace for Pull Target (operation 312)
    Finds valid, active target (true/false)
  F: Handle Targeting (operation 314, with additional details described with reference to FIG. 4)
    If needed:
      Untarget previous Pull Target (FIG. 4, operation 402)
      Target new Pull Target (operation 404)
      Set reference to the current active Pull Target (operation 406)
    Is there a valid Pull Target to move toward? (operation 408)
      Yes
        F: Attach Detach Helper Spline (detach) (operation 410)
        F: Set Variables (operation 412)
        F: Convert Path to Spline (operation 414)
      No
        F: Attach Detach Helper Spline (attach) (operation 416)

Turning to an explanation of other functions, the "Get Pull Alpha from Motion Controller Movement" function (called at operation 306) returns an alpha value (0-1) based on the motion controller's location between two points, namely the starting point (where pulling is first activated), and a fixed (or optionally calibrated) distance such as 12 cm behind the starting point along a 2D vector pointing from the Pull Target through the starting point. The alpha value is used in various ways described herein (e.g., "Ease Pull Alpha to Path Length Traveled" function and "Translate Character on Path" function).

In one implementation, the Pull Locomotion Component relies on an arbitrary minimum pull distance length. For example, a pull action can be set such that the controller needs to travel 12 cm along the 2D vector to complete full travel along the spline. Note, however, that a Pull Target that is a mile away in the digital world and a Pull Target that is a meter away in the digital world will both take the same amount of physical motion to travel. If Pull Targets are not evenly spread, the disparity is noticeable.

The 12 cm value can be an arbitrary default value that does not take into account physiological disparity between users and what a comfortable distance might be. It is feasible to both calibrate a user's maximum comfortable pull motion, and use scaling of the pull distance based on the comparative distance to the current Pull Target.

The "Ease Pull Alpha to Path Length Traveled" function (called at operation 308) eases the alpha value supplied by the Get Pull Alpha from Motion Controller Movement function. For example, in one or more implementations, an ease-in function is used to remove unwanted player character movement that can result from hand shaking. For example, when the user first grabs a Pull Target, the user's hand tends to be unsteady, which usually translates into a lot of movement and discomfort. By applying an ease-in function, any initial values are dampened such that the user has to pull decisively to move. This function can be tuned to be more or less aggressive, e.g., to allow for movement sooner and not be surprising to first time users. Additionally, the function can multiply the path length variable by the eased alpha to determine where along the spline path the Player Character needs to be. This is set as the Path Length Traveled variable.

Figure 5:
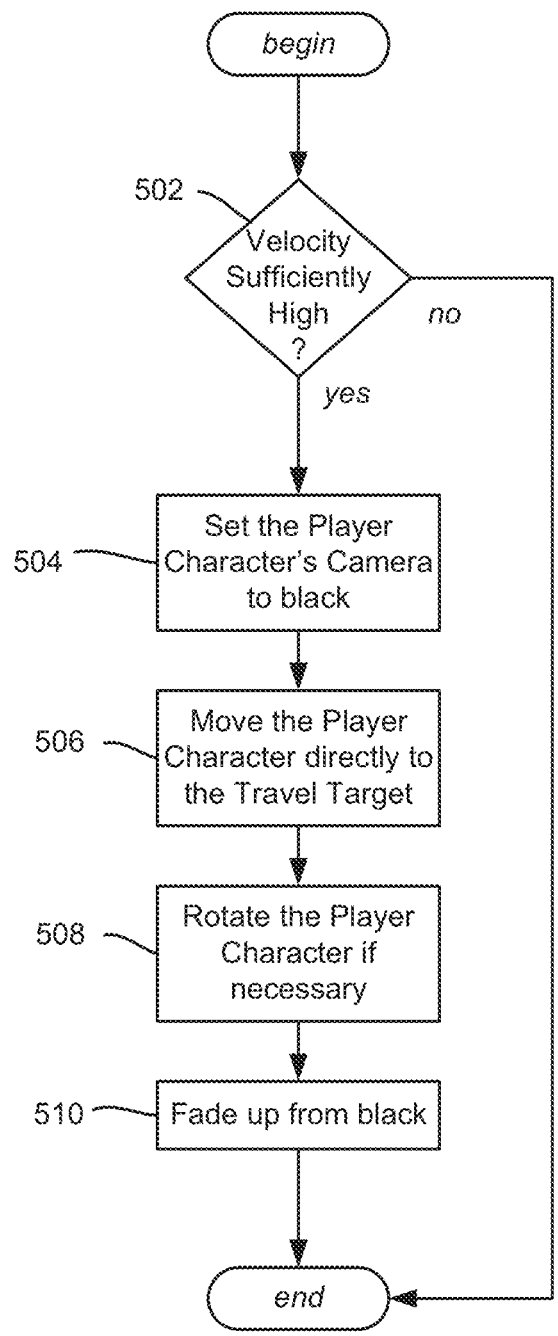
FIG. 5 is an example block diagram representing example logic operations based on high velocity pull locomotion, in accordance with various aspects and embodiments of the subject disclosure.

The "Translate Character on Path" function moves the Player Character in space, such as by using a Path Length Traveled variable provided by Ease Pull Alpha to Path Length Traveled function, in conjunction with the engine-provided function GetLocationatDistanceAlongSpline. The "Translate Character on Path" function outputs the current location along the spline to which the Player Character moves. FIG. 5 shows additional logic that occurs in between, beginning at operation 502 which evaluates whether the Player Character's velocity is sufficiently high that the player will arrive within the next n (e.g., 3) frames.

If yes, the following operations are performed:
  Set the Player Character's Camera to black ("Blink") (operation 504)
  Move the Player Character directly to the Travel Target, skipping the rest of the path (operation 506). Note that this feels much faster than arriving as normal.
  Rotate the Player Character if necessary (operation 508)
  Fade up from black (operation 510)
No
  Continue as normal It is also feasible to evaluate whether the Player Character's velocity is sufficiently slow (which can be calibrated) such that using Blink is unnecessary. If so, however, Blink may still be used with rotation. To this end, when the desired Pull Target corresponds to rotation of the Player Character, on arrival, the Player Character's camera is set to black ("Blink"), the Player Character is then rotated, followed by fading up from black. This properly rotates the player without disorienting him or her.

Figure 6:
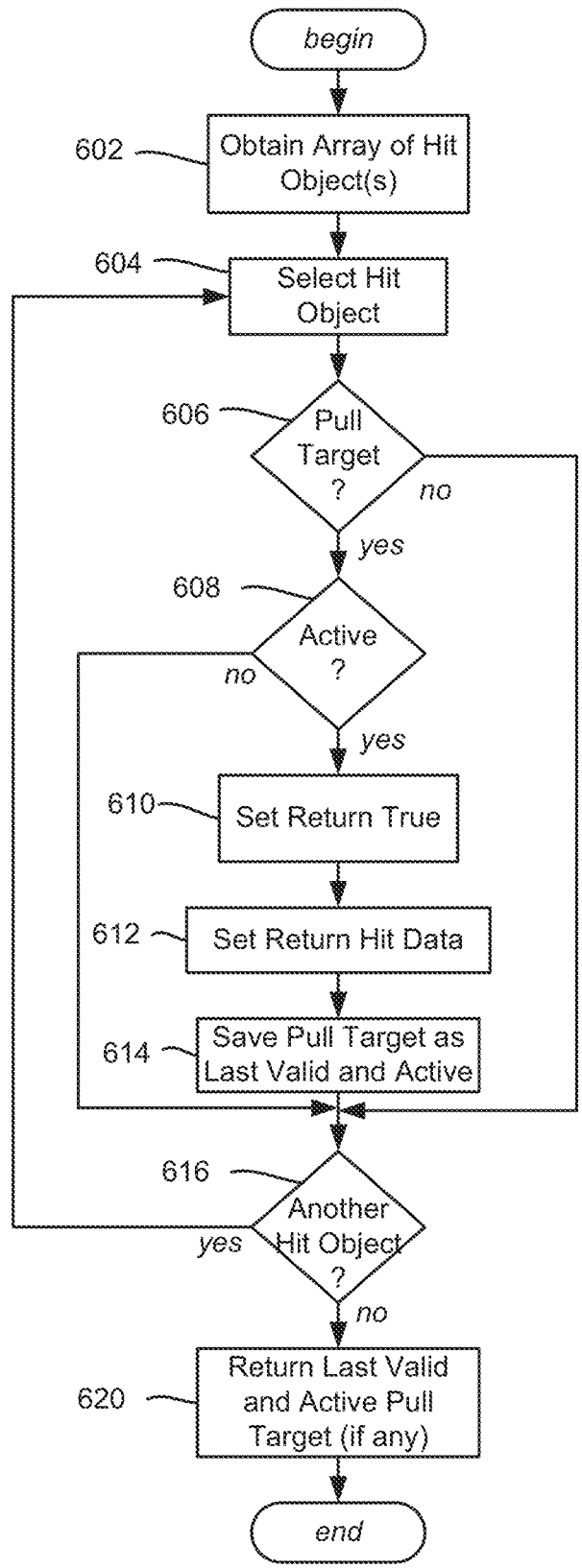
FIG. 6 is an example block diagram representing example logic operations of trace function, in accordance with various aspects and embodiments of the subject disclosure.

When the game/experience is running, the Pull Locomotion component uses an engine-provided Sphere Trace function to scan for Pull Targets. This trace is run from the user's motion controller out into the world, using an approximate forward vector of the motion controller for direction. Thus, when a user moves the motion controller, the user is sweeping a spherical ray trace out from the front of the controller over the world's objects. This trace function returns an array of objects that respond to being hit on the PullLocomotion (custom) Trace Channel. The last active, valid Pull Target that is hit from this array is selected, via the logic path represented below and in FIG. 6:

The MultiSphereTraceByChannel trace returns each object that responds to the designated channel, in this case the custom PullLocomotion channel. Pull Targets are set to respond to this channel. This represented in FIG. 6, where the array of hit objects obtained at operation 602 is processed in a loop (via operations 604 and 616). For each hit object returned by the trace, operation 606 evaluates whether the hit object is specifically a Pull Target; if not, the loop continues over the array of hits.

If the object is a Pull Target, operation 608 evaluates whether the Pull Target is active (available for use). If an active Pull Target, operation 610 sets return to true, and operation 612 sets return hit data. Operation 614 preserves the last valid, active Pull Target in the array for returning (operation 620) to the Handle Targeting function after the loop completes.

Figure 7:
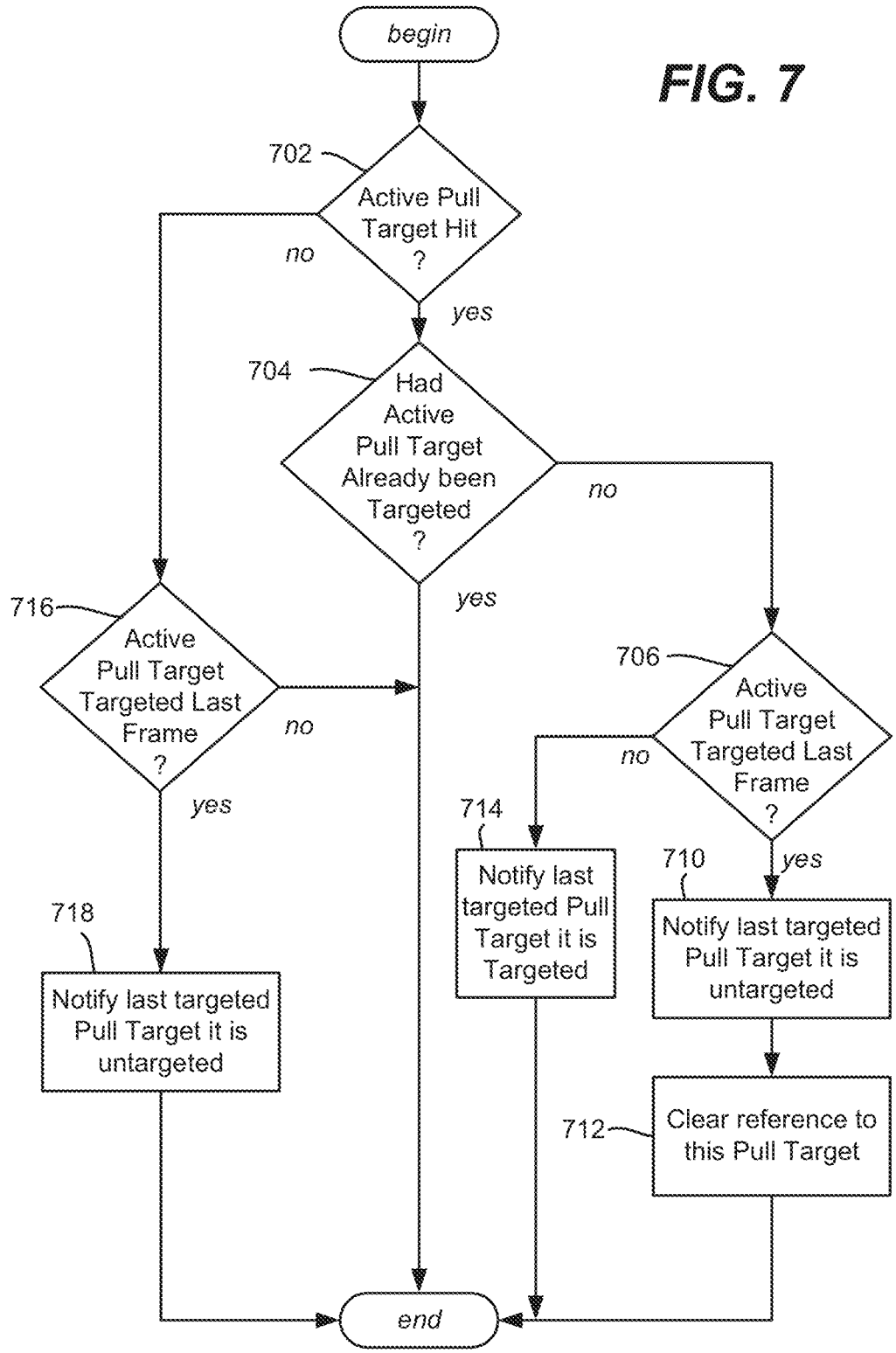
FIG. 7 is an example block diagram representing example logic of a handle targeting function, in accordance with various aspects and embodiments of the subject disclosure.
Figure 8:
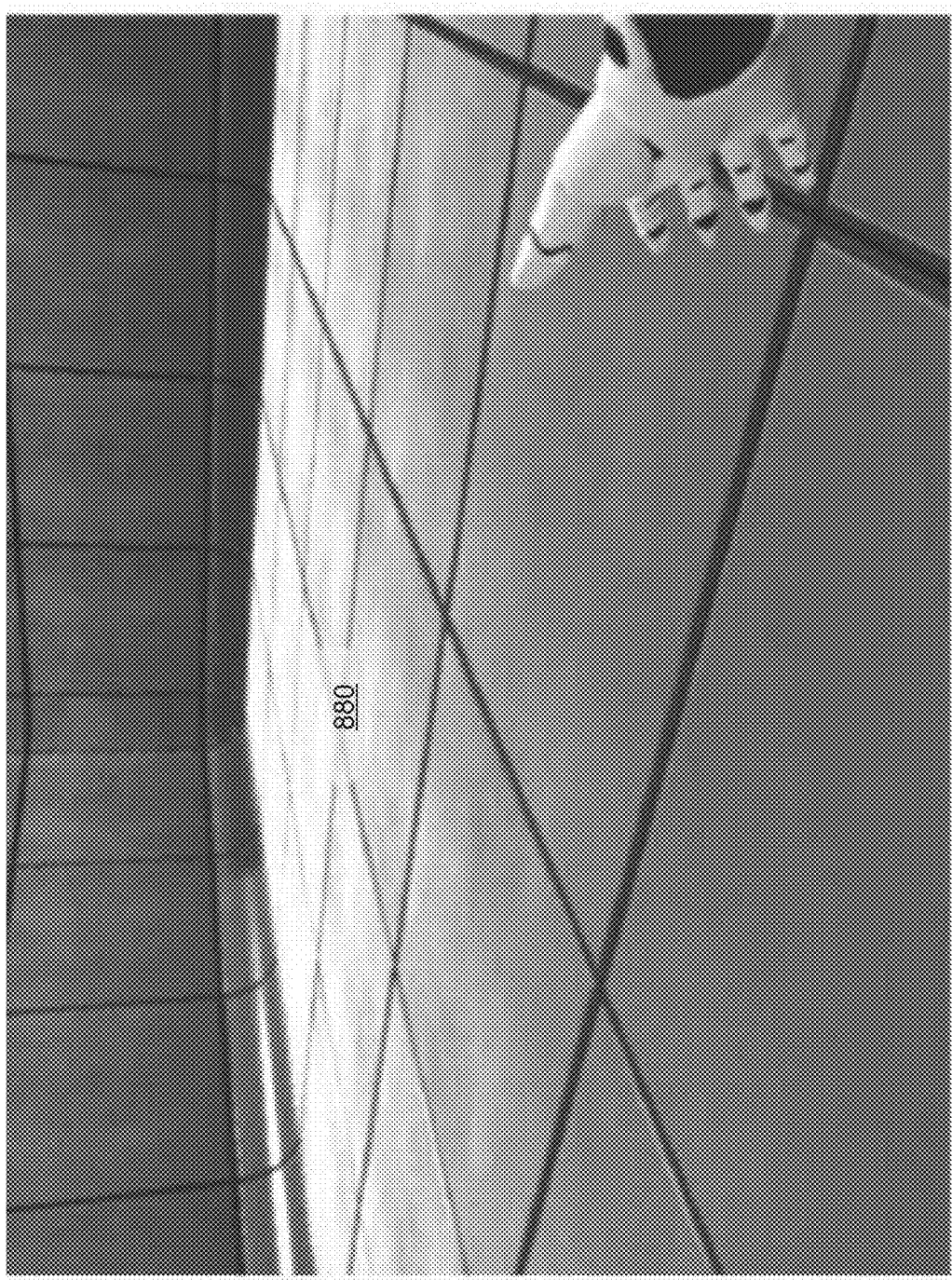
FIGS. 8-17 provide visual examples to demonstrate various aspects of pull locomotion and pull locomotion logic, according to one or more embodiments described herein.

The Handle Targeting function is called after the Trace For Pull Target function and uses the hit result (true/false) and hit data (if true). The general purpose of this function is to notify Pull Targets they have been targeted or untargeted. FIG. 7 summarizes the general logic, beginning at operation 702 which evaluates whether an active Pull Target was hit, e.g., based on the True/False value returned by Trace For Pull Target. If yes, operation 704 evaluates whether the active Pull Target already had been targeted; if so continue, else if not branch to operation 706, which evaluates whether an active Pull Target was targeted last frame. If so, operation 708 notifies the last targeted Pull Target that it is untargeted, and operation 710 clears the reference to this Pull Target. Otherwise operation 714 notifies the active Pull Target that it is targeted.

Returning to operation 702, if an active Pull Target was not hit, operation 716 evaluates whether an active Pull Target was targeted last frame. If yes, operation 718 notifies the last targeted Pull Target that it is untargeted Attach Detach Helper Spline (bool) takes a Boolean when called to either Attach (true) or Detach (false) the Spline. When the Player Character is not moving, the spline is attached to the Player Character. This is so that the Spline's points are easily set relative to the Player Character's position. The Spline is detached before the Player Character moves so that it remains relative to the world; otherwise the Spline would travel with the Player Character making the path useless. Based on the Boolean provided, the function calls either engine functions AttachToComponent or DetachFromComponent. The function also sets the Boolean Spline Attached for reference within the Pull Locomotion Component.

The Set Variables function sets the necessary variables to travel to the desired Pull Target. Travel Targets describes the Pull Target's suggested location in World Space and Relative (to the Player Character) Space. Starting Location represents the Player Character's location in World Space. The Pull Target's specific Player Character rotation is also known.

In addition to their own location in the world, Pull Targets have properties for arrival location and rotation that differ from the Target's own. This allows for the Pull Target to appear visually in one place but send the user to a slightly different location and/or rotation. For example, if a Pull Target is placed on a cliff facing the ocean, the player should be facing the out over the cliff when they arrive, regardless of their rotation prior to arrival. This is what is meant by Travel Target.

The Convert Path to Spline function uses the engine-provided function FindPathtoLocationSynchonously node to get a Navmesh path between the World Space Travel Target and Player Character Starting Location. It is easier to manipulate a Spline object than a Navmesh path, so a conversion operation is performed.

FindPathtoLocationSynchonously describes Path Start representing the Player Character World Location and Path End, the Travel Target World Location. This returns a Navigation Path Object, getting Path Points as array. In a loop, for each Path Point in the array, a new Spline Point is made, and the Spline Point is added to the Spline Point array. When the loop is complete, the Spline Point array is added to the Spline and updated. The new length of the Spline is obtained and set to variable Path Length.

Pull Targets are objects in the Unreal Engine game world that serve as waypoints to which the user can travel to by pulling with a motion controller. Pull targets are able to be activated or deactivated, to be notified of being targeted or untargeted, and to deactivate themselves if a user is too close or arrives. The basic architecture of a Pull Target is described below.

Capsule Component is an invisible volume that responds to traces on the PullLocomotion Trace Channel. InterestRotation is a blank object that stores a location and rotation. It is referenced by the Pull Locomotion Component when a user is arriving, so that the Player Character will be rotated to the desired rotation (optional). PullTargetVisualization is an arbitrary object or visual effect designed to communicate state to the user In one particular experience, the concept of Previous and Next Targets are provided. When the user arrived at a target, that target can then activate the Next Target to which it had a reference. Another solution provides a node graph editor that enables the design of specific paths and node-to-node dependencies.

One of the Pull Target functions comprises Begin Play, in which if the target has been explicitly told to begin in an active state; the target calls a function, Activate, on itself. This takes care of any needed functions for visual effects and sets PullTargetVisualization's visibility is based on whether or not the target is active. Thus, another Pull Target function is an Activate (bool) function, which sets an "Is Active" variable to bool. If bool=true, an engine-provided function SetCollisionResponsetoChannel is called, setting the response to channel PullLocomotion to Block; any desired visual effect function to represent being activated can be used. If bool=false, the engine-provided function SetCollisionResponsetoChannel is called, setting the response to channel PullLocomotion to Ignore; any necessary visual effect function can be used to represent being deactivated.

Another Pull Target function is Targeted (bool), which sets a Targeted variable to bool. If the target is inactive, nothing is done. When the target is active, further operations depend on whether Targeted true or false, that is, if true, any desired visual effect function to represent being targeted can be used, or if false any desired visual effect function to represent being untargeted can be used.

The Pulling (alpha) function is called by the Pull Locomotion Component on the Player Character while the user is moving. The Pulling function keeps the Pull Target that is in use appraised of how close the user is. This allows the Pull Target to automatically deactivate when the user arrives. The caller receives the alpha value when called, and determines whether this target is active AND has an alpha very nearly equal to 1 (end of path of travel). If yes, call Activate (false) on itself, otherwise do nothing.

Figure 9:
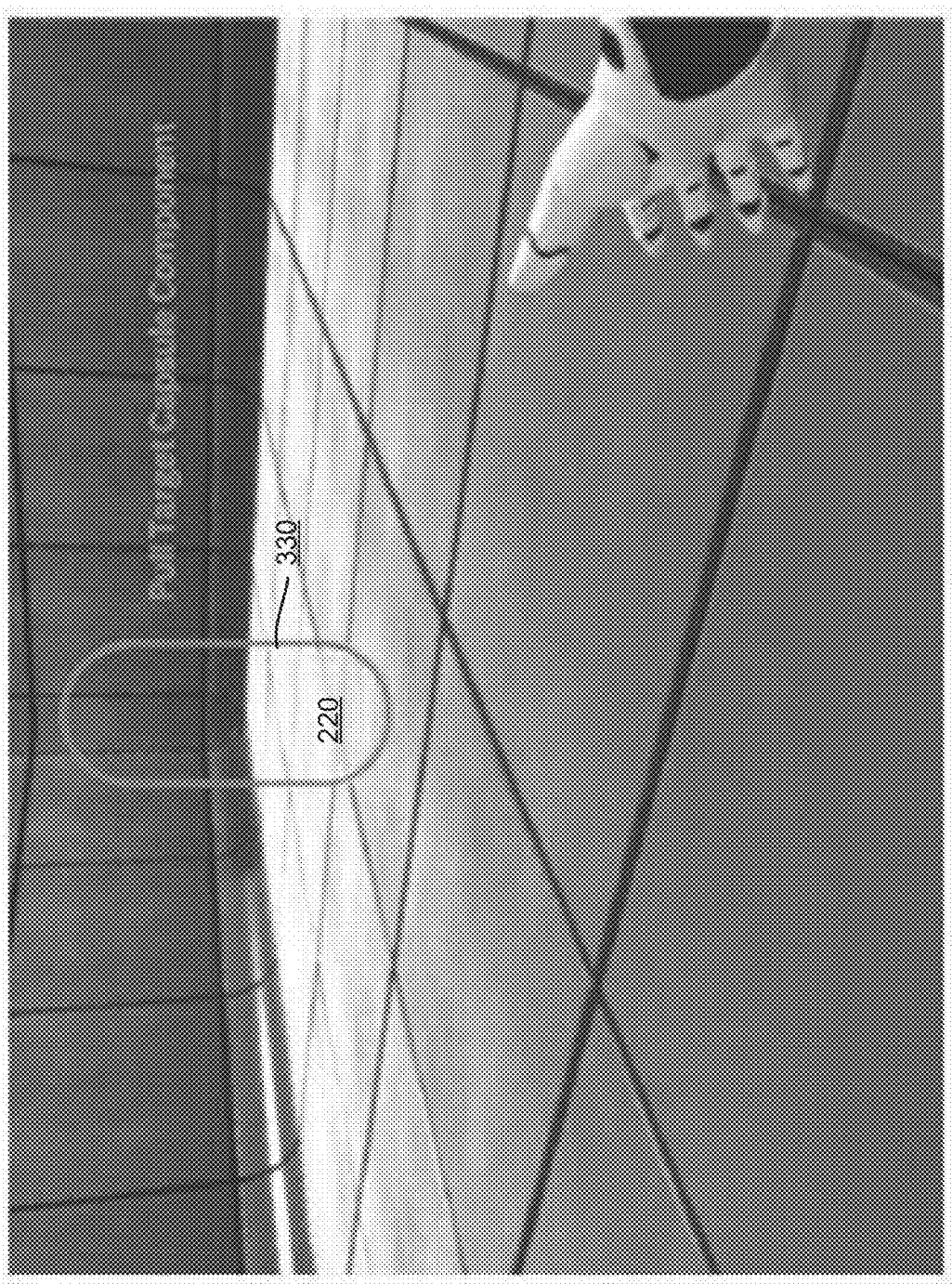

The OnComponentBeginOverlap(Capsule Component) is a function that detects any overlaps on the Capsule component. This function is used to make sure to deactivate the Pull Target in the case where the user is arriving very slowly (not nearly 1 in the Pulling alpha value) but close enough for any visuals of the Pull Target to cause discomfort. If the target is active AND is the overlapping object the Player Character, call Activate(false) on itself, otherwise do nothing FIGS. 8-17 show an example of how pull locomotion is presented to a virtual reality user and operates based on the user's actions, beginning at FIG. 8 where a Pull Target 880 is presented to a user. As shown in FIG. 9, a Pull Target Capsule Component (described above) comprising a volume (invisible to the user) responds to traces on the pull locomotion trace channel as described herein.

Figure 10:
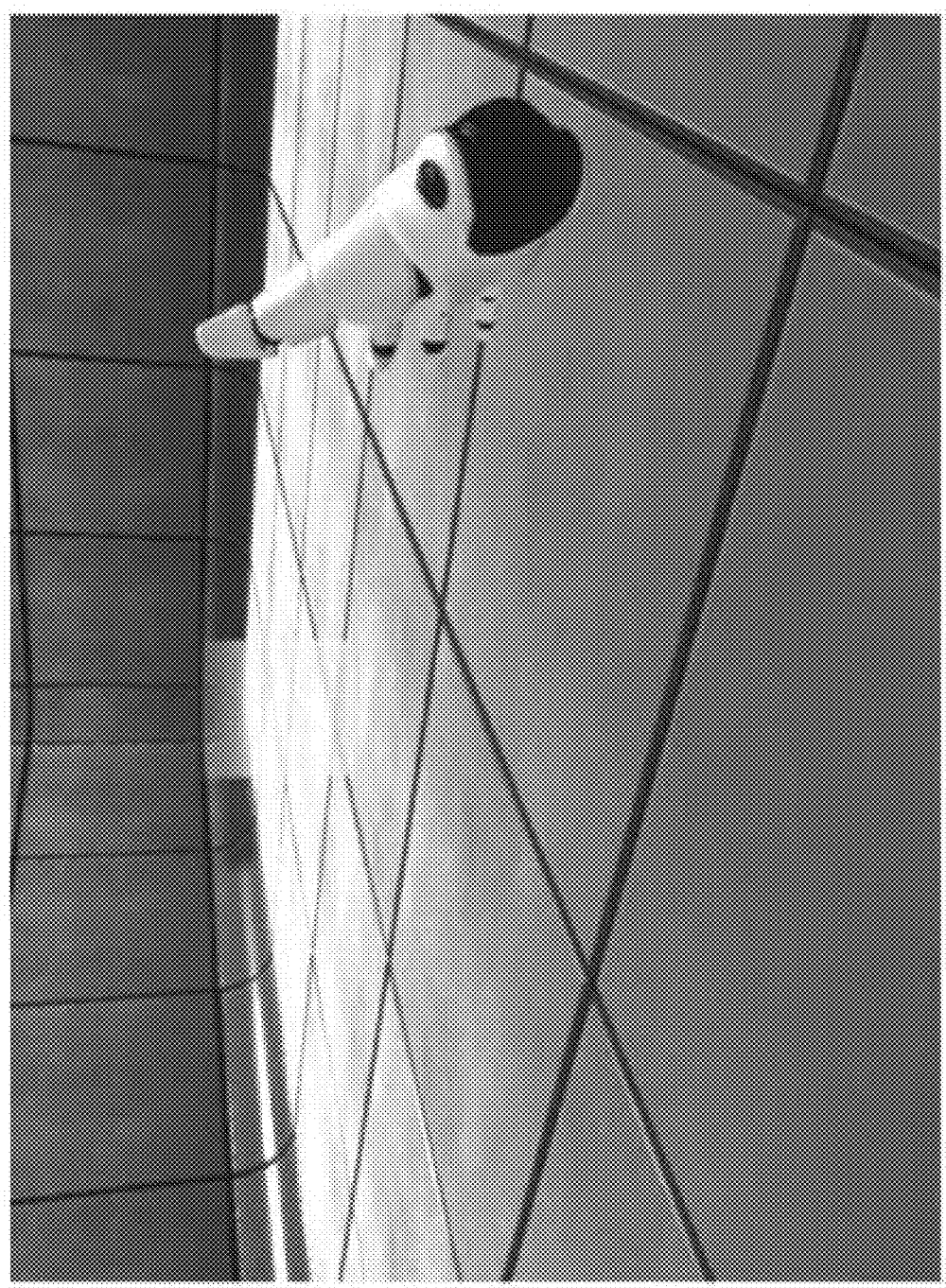
Figure 11:
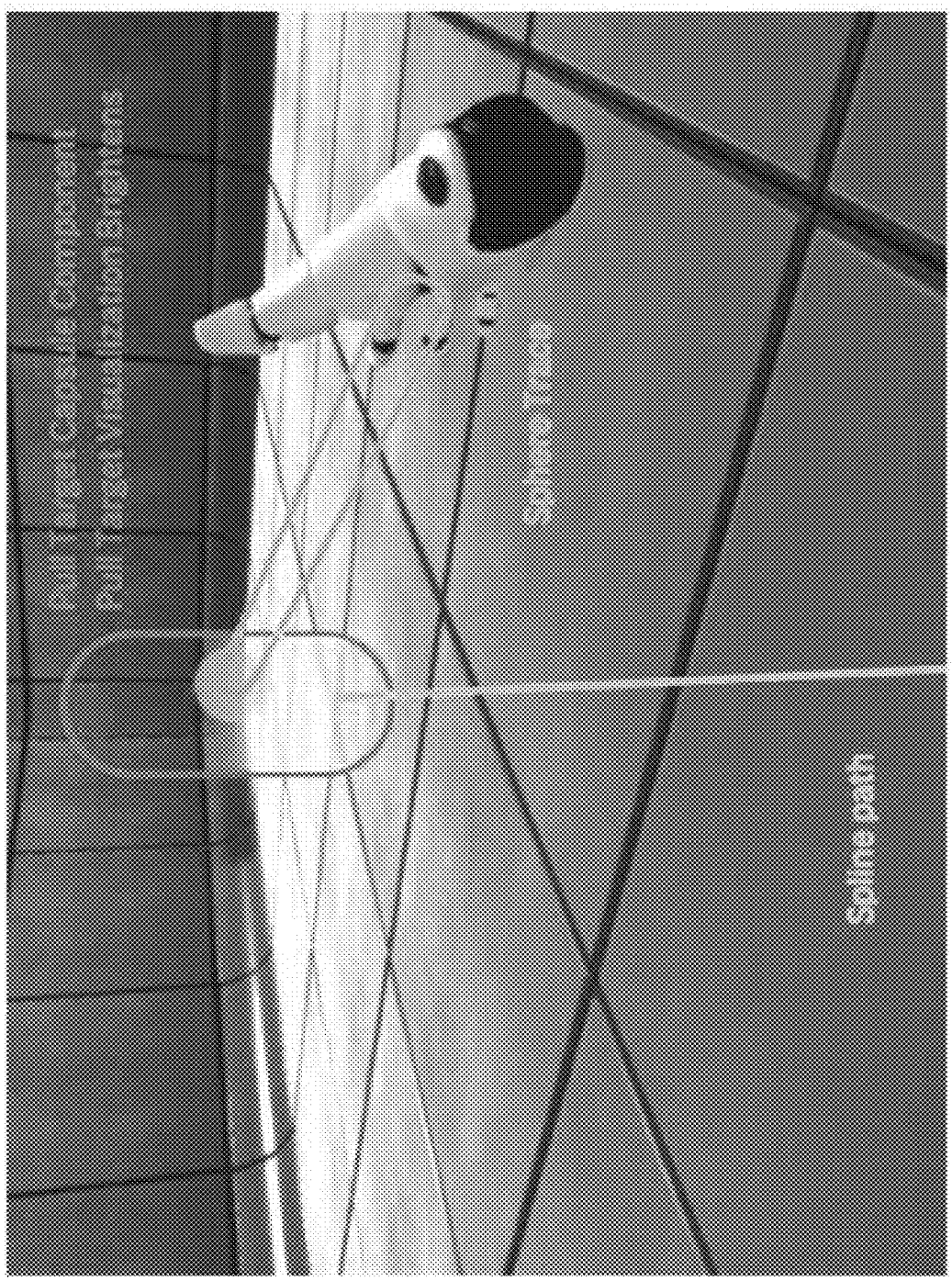

FIGS. 10 and 11 show how the Pull Target visualization brightens, e.g., as the user's hand controller approaches the Pull Target. In FIG. 11, a sphere trace and spline path are also illustrated.

Figure 12:
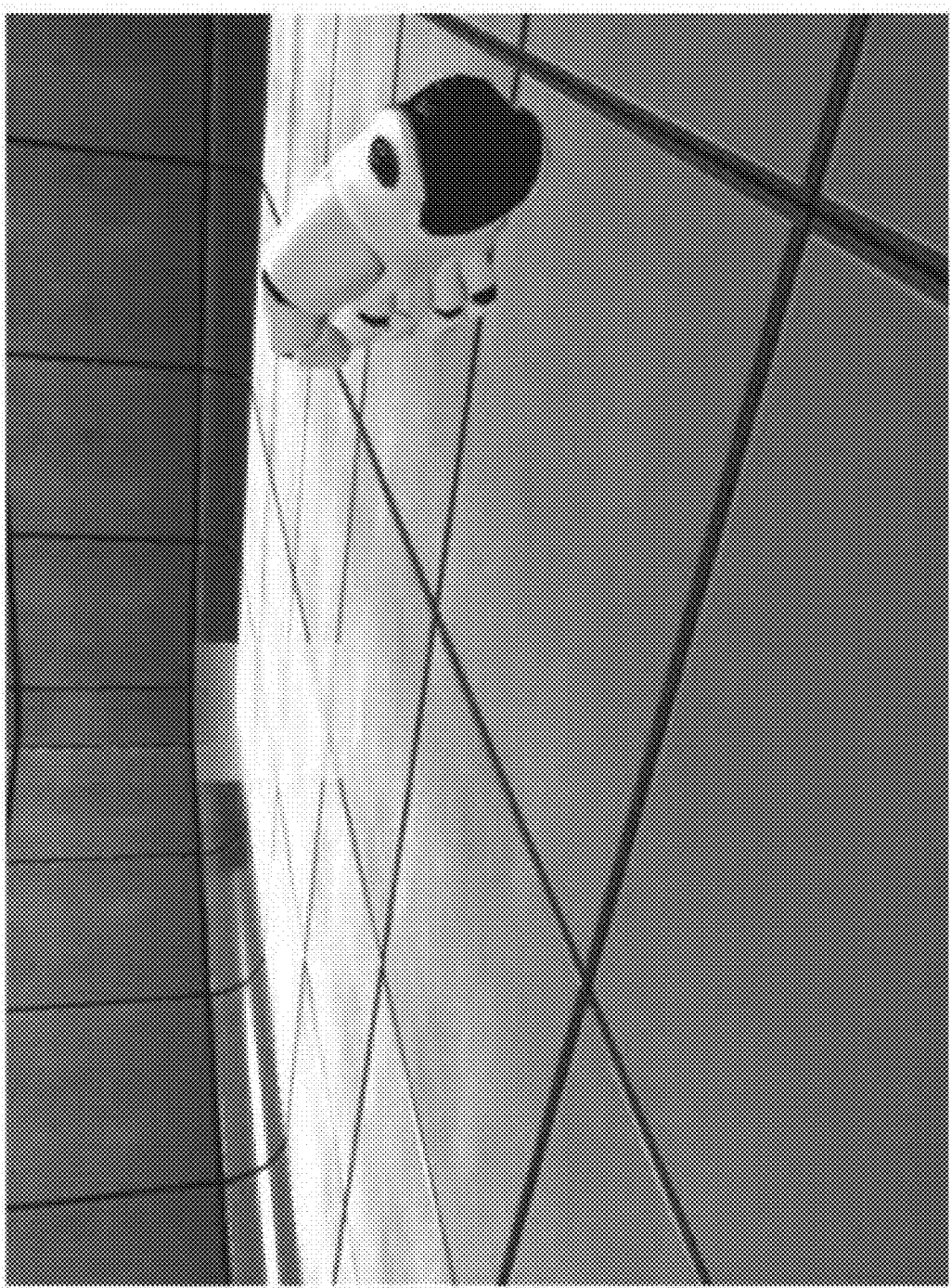
Figure 13:
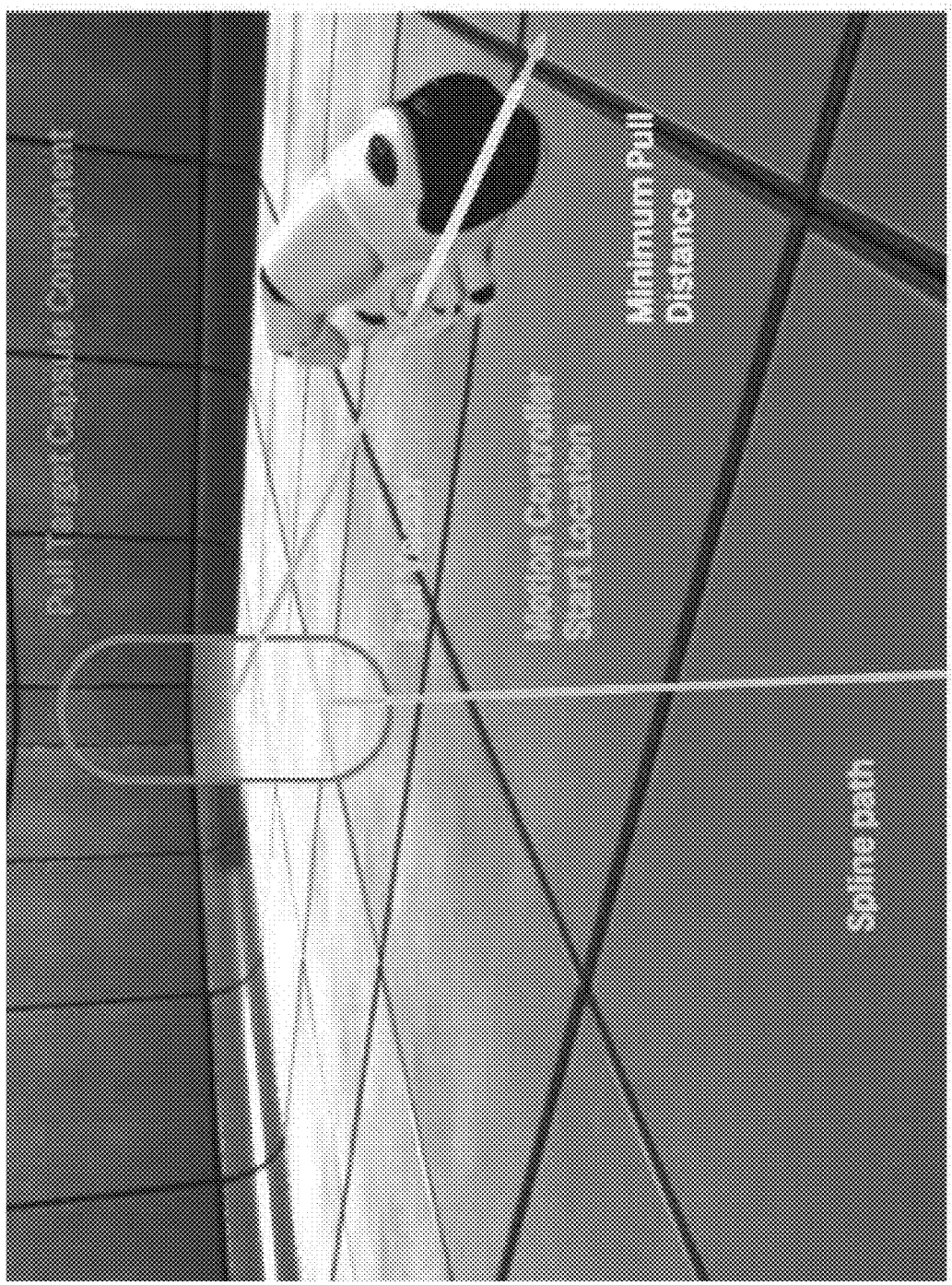
Figure 14:
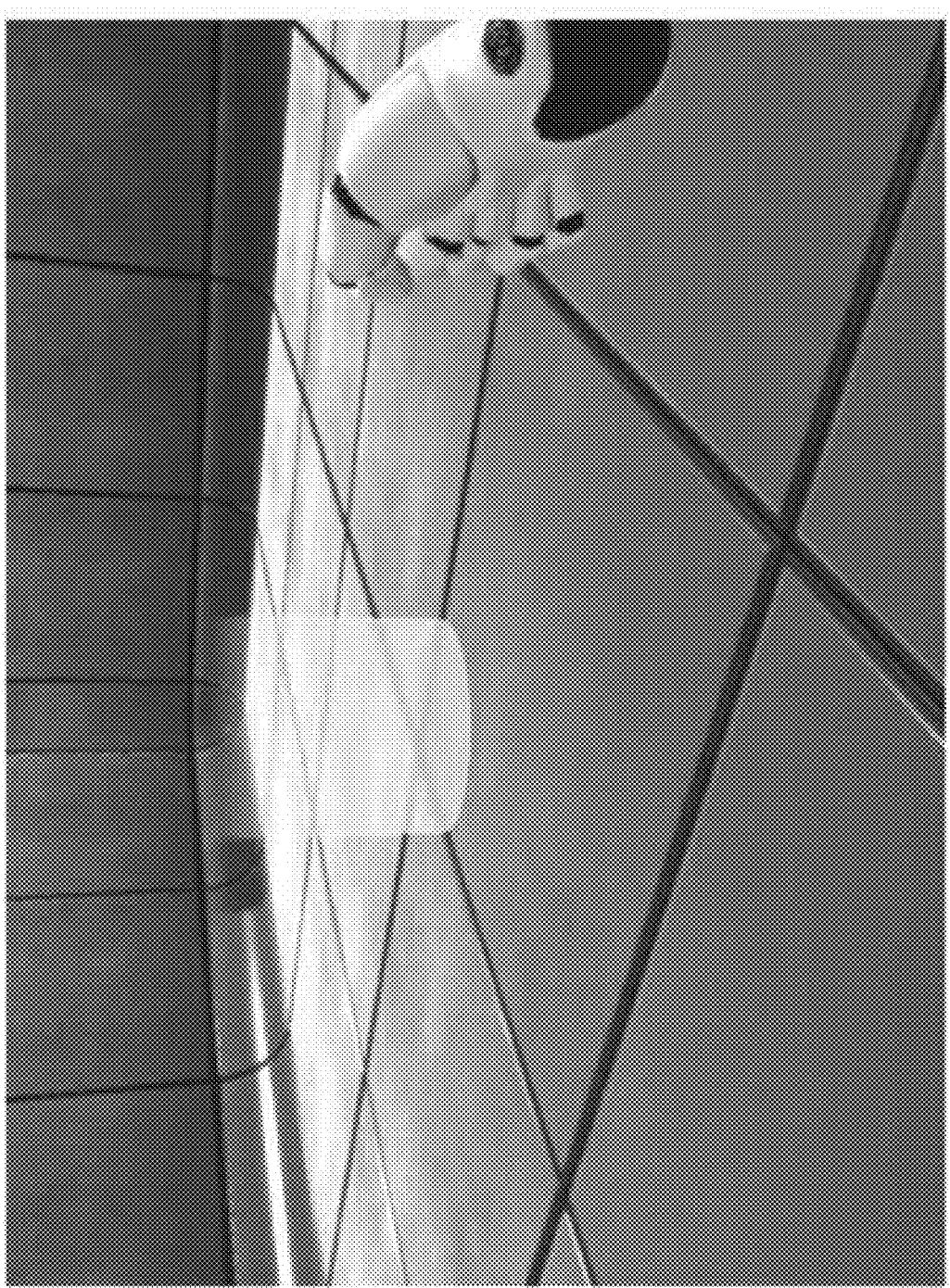
Figure 15:
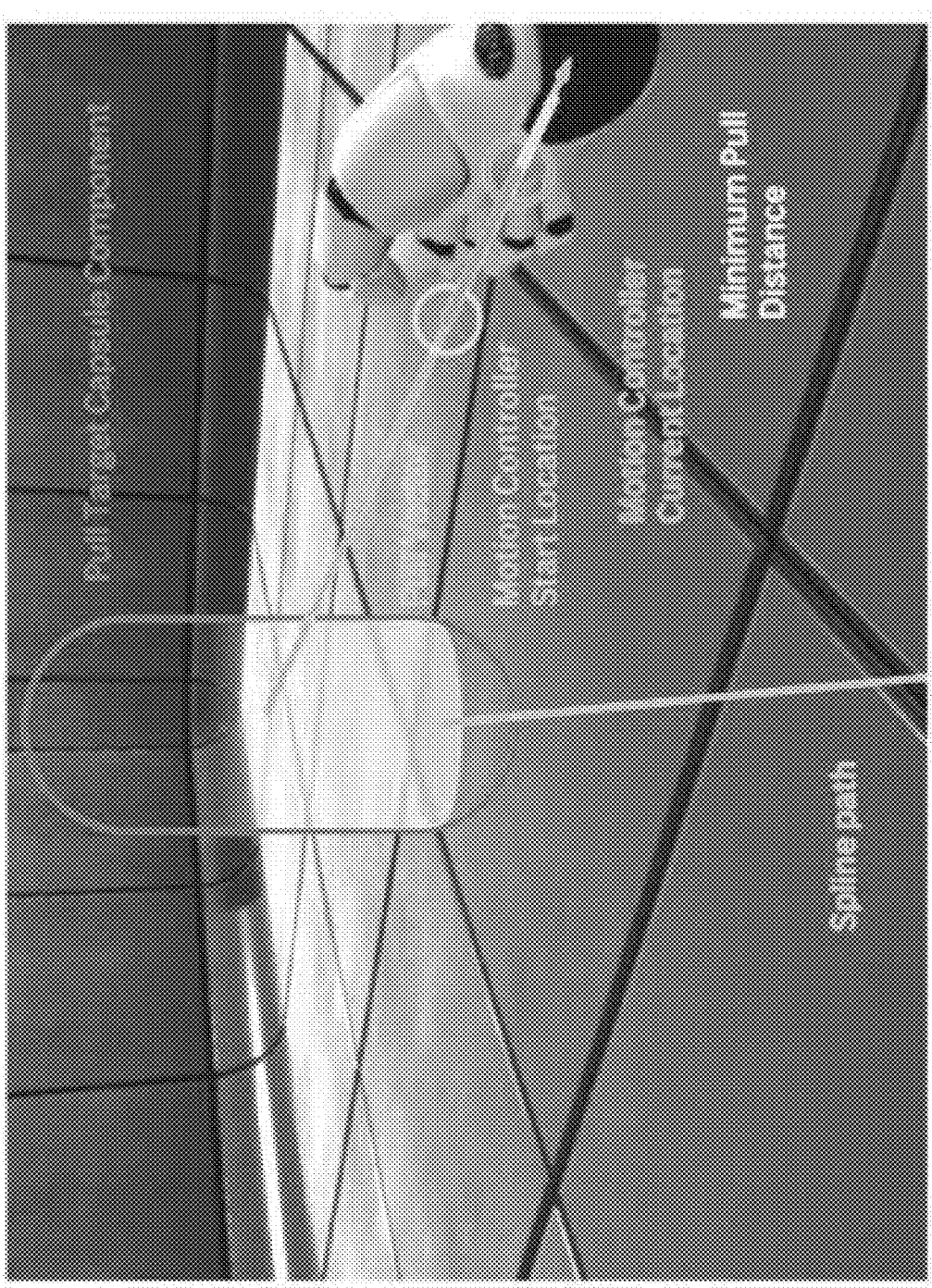

FIGS. 12 and 13 illustrate the concept of a pull vector, along with the motion controller start location and a minimum pull distance. FIGS. 14 and 15 illustrate the start location and current location along the pull vector.

Figure 16:
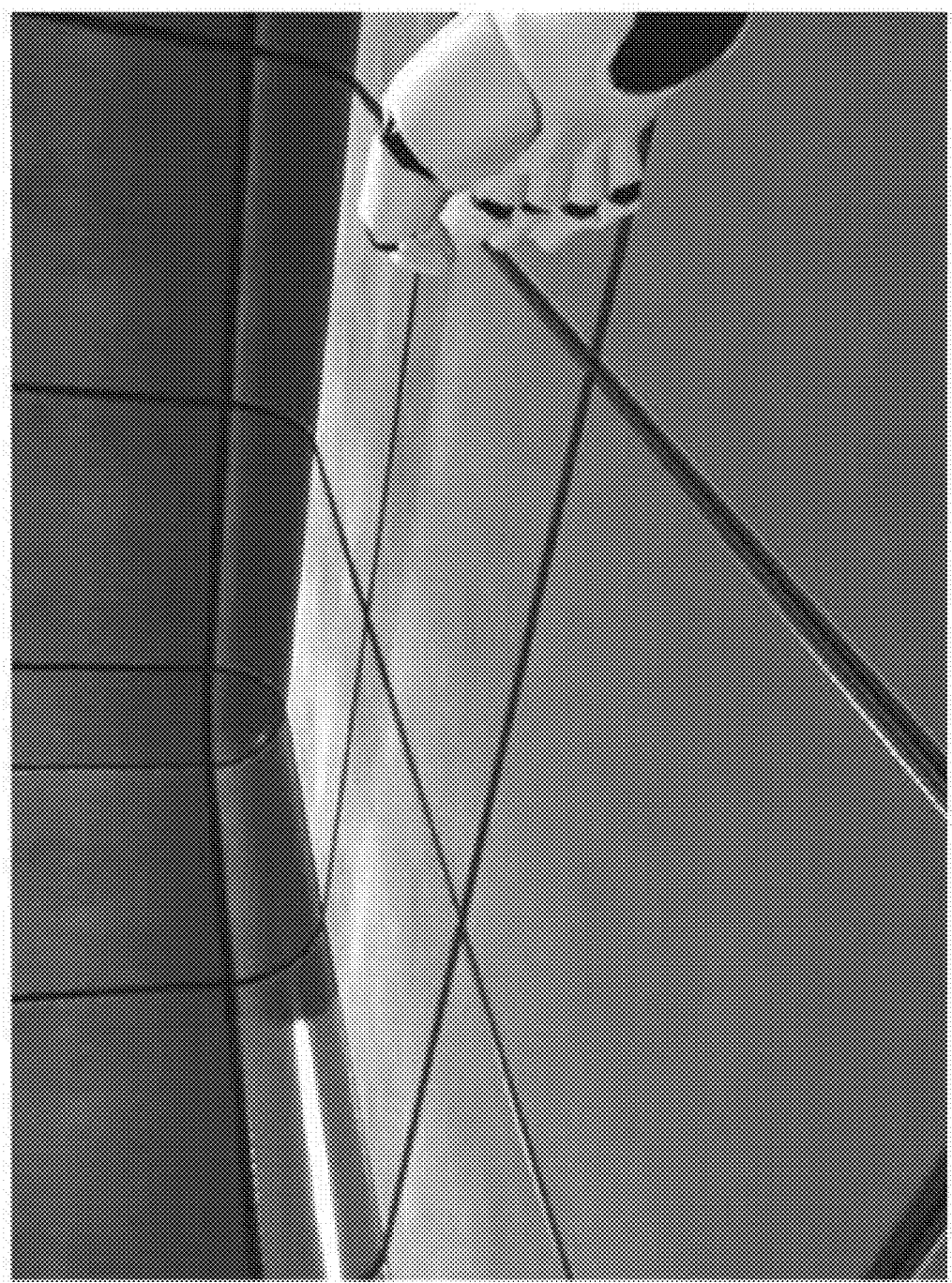
Figure 17:
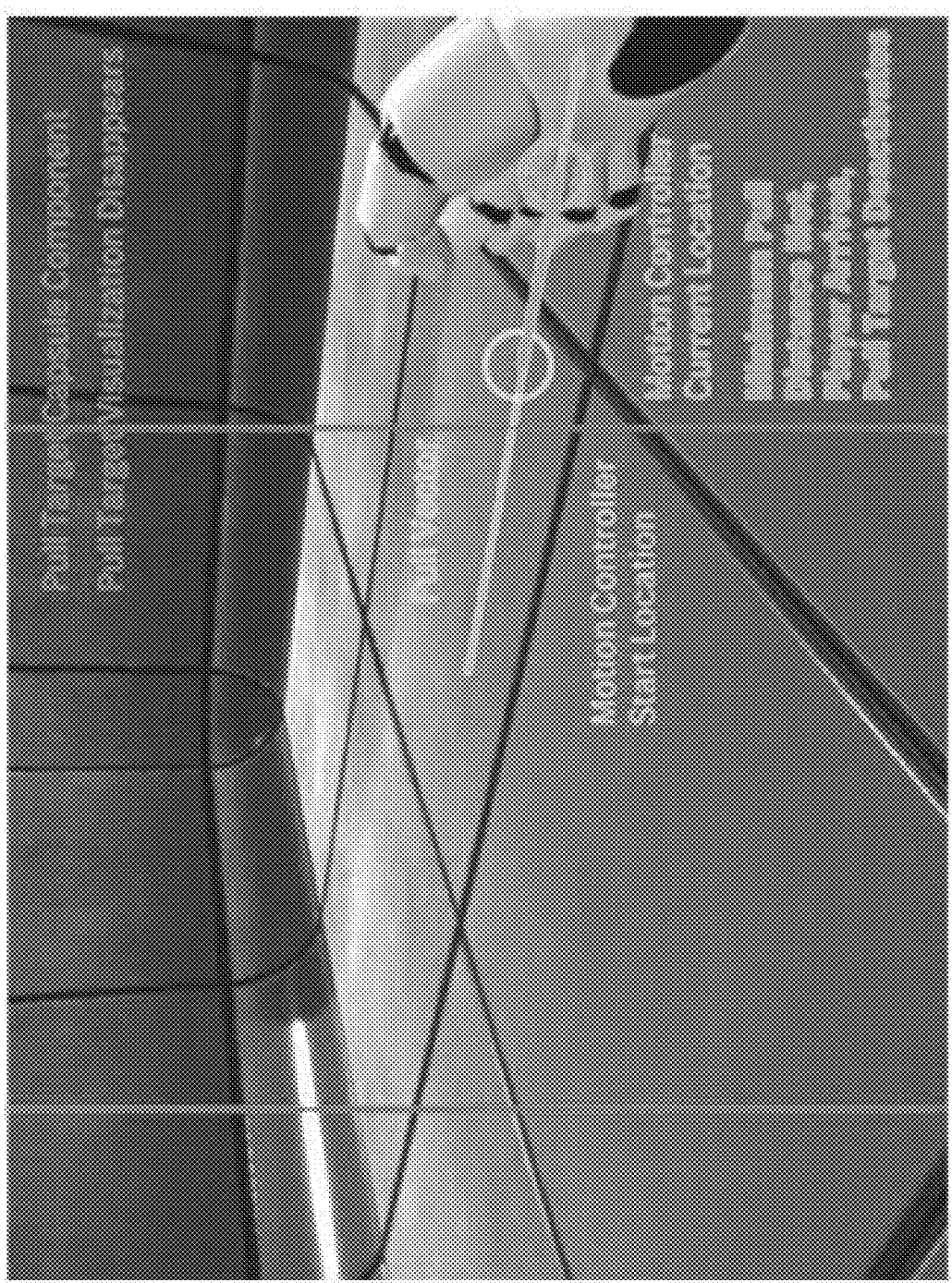

FIGS. 16 and 17 illustrate the arrival when the minimum distance is met. Note that in FIG. 17, the player has arrived, and the Pull Target visualization disappears. Also illustrated is the start location and current location along the pull vector.

Thus, when the user reaches toward a Pull Target and grabs, the Pull Locomotion Component (logic) draws a line from the controller away from the target. As the user pulls the user's controller/hand toward himself or herself, the controller's closest point on this line is found. The travel percentage of the controller along this line determines the user's location from the user's starting location to the target. As long as the user is grabbing, the user can move toward or away from the target. In one or more implementations, the user can only move away to the point where he or she began pulling. For example, if the user starts pull locomotion at a location A and moves towards a point B via pull locomotion, the user cannot push away to behind point A, even if the user can extend his or her arm such that the controller moves further than where the controller began pull locomotion. Notwithstanding, in other implementations such movement to behind the starting point is feasible.

Because slight hand movements can result in "noisy" movement (especially when first grabbing), one pull locomotion implementation uses one or more easing functions to create a smoothly accelerating movement.

Moreover, there can be additional logic to increase the user's perceived speed of movement; for example, if the user is travelling at a high enough velocity that an arrival ease-out will not be perceived, the user can be transported directly to the Pull Target. As one example, this allows users to move more elegantly when they feel like it (perhaps to observe a beautiful environment) or to quickly "whip" through locations they have previously seen. A threshold velocity can be used to make such a determination, and such a threshold value can be user configurable, at least to an extent.

Further, in one or more implementations, Pull Targets disappear when the user arrives within a threshold distance. The threshold pull distance is an arbitrary value, and, for example, can be a default distance, which can be further configured/calibrated by the user. Users with longer or shorter arms will travel more slowly or quickly, depending on their distance from the Pull Target, which again can be user configurable/able to be calibrated.

In one or more aspects, rotation is handled by "blinking" a user to a preferred heading, if the application determines that the user's arrival heading is not optimal; e.g., if the user will be unable to see the next sequential Pull Target. Navigation mesh (navmesh) can be used to generate more complex paths to Pull Targets. This means that if desired by a program, fewer intermediate Pull Targets need to be used for movement across a large space.

Notwithstanding, there can be a limit as to how much lateral motion can be experienced along a path before the user feels like he or she is moving away from the desired location. Some easing/smoothing may be used to deal with such lateral motion.

In general, the user's motion is tied to a gross body movement. As a result, the user is able to feel the relationship between his or her arm motion relative to the environment. The relatively large amount of movement (basically up to a full arm length) creates a cognitive load that minimizes the perception of motion that can feel unpleasant/result in motion sickness.

Moreover, easing the user's travel via pull locomotion provides a fun feeling, especially on arrival, with the consecutive grabbing of Pull Targets (by releasing upon arrival at one target and reaching out and grabbing the next target) somewhat like swinging through trees. Note that this is in contrast to current methods that use gross movements like skiing or swinging both arms to move, which are often more intense, tiresome, and potentially dangerous depending on the user's surroundings, as well as quickly heating the user's body, any or all of which can have a negative effect on virtual reality comfort.

The pull locomotion technology described herein provides some level of perceived freedom. For example, while in general a user cannot go everywhere in a virtual world via pull locomotion, a user can use multiple Pull Targets to maneuver to a specific position. When a user releases his or her grip before arrival at a Pull Target, the user stops at the corresponding intermediate point. Pulling to a next target moves the user in a direction to which the user may not have had line of sight, relative to the user's initial position.

In one or more implementations, rotation is handled only on arrival and only when needed. Rotating the user while on a track can cause nausea, and "blinking" is often disorienting because it requires the user to reorient from scratch. By only rotating the user when he or she arrives at a suboptimal heading, and blinking when rotating (and in general only blinking when rotating), the technology described herein minimizes challenges to immersion that are present in other technologies. For example, in a locomotion method such as teleportation, the user "blinks" every time the user arrives at a new location, regardless of heading. Repeatedly teleporting is disorienting unless some sort of time slowdown effect is used. Even with a slowdown effect, placing the next desired teleport location can be tedious.

In one or more implementations, points of interaction are clearly defined to the user. Pull targets can clearly identify where the user can go and how to get there. Targets can be very sophisticated; for example targets may be controlled by logic (including rules, attributes, etc.) that only presents/allows certain paths to the user, as well as hiding targets that are out of reach. A user may only see the "next" target(s) from the user's current location.

Figure 18:
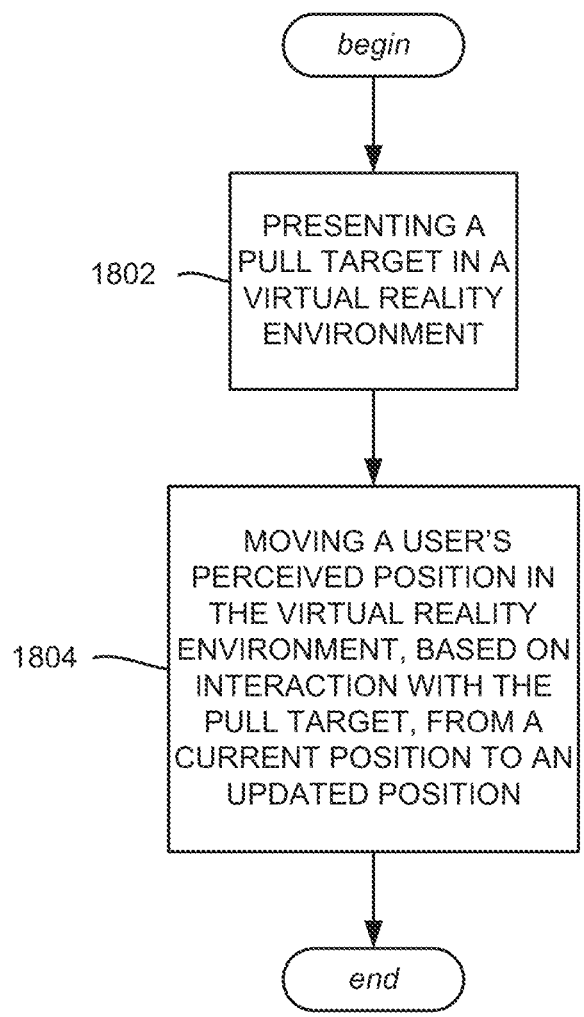
FIG. 18 is an example flow diagram showing example logic/operations related to presenting a pull target in a virtual reality environment and positioning a user based on interaction therewith, in accordance with various aspects and embodiments of the subject disclosure.

One or more example aspects, such as corresponding to operations of a method, are represented in FIG. 18. Operation 1802 represents presenting a pull target in a virtual reality environment. Operation 1804 represents moving a user's perceived position in the virtual reality environment, based on interaction with the pull target, from a current position to an updated position.

The interaction with the pull target can gradually pull the user's perceived position from the current position towards the updated position. The interaction with the pull target can gradually push the user's perceived position away from the current position towards the updated position. The interaction with the pull target can initially accelerate the user toward the updated position.

Aspects can comprise making the pull target disappear in response to determining that the updated position is within a threshold distance of the pull target.

Moving the user's perceived position in the virtual reality environment from the current position to the updated position can comprise using smoothing. The pull target can be a first pull target, and aspects can comprise, presenting a second pull target based on the updated position.

Figure 19:
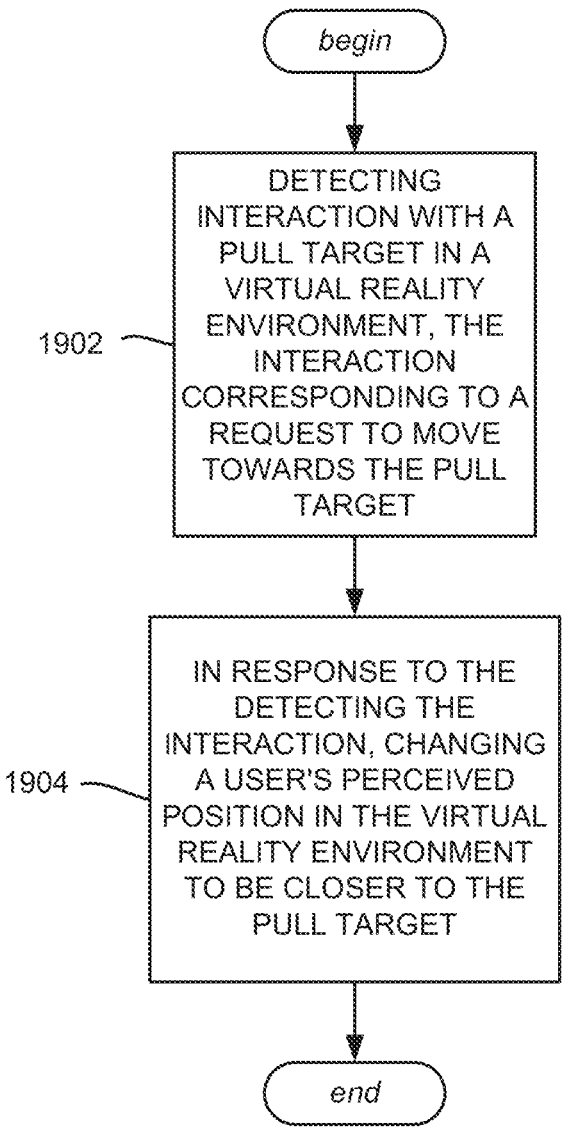
FIG. 19 is an example flow diagram showing example logic/operations related to changing a user's perceived position in a virtual reality environment based on detecting user interaction to move towards a pull target, in accordance with various aspects and embodiments of the subject disclosure.

One or more aspects can be embodied in a system, such as represented in FIG. 19, and for example can comprise a memory that stores computer executable components and/or operations, and a processor that executes computer executable components and/or operations stored in the memory. Example operations can comprise operation 1902, which represents detecting interaction with a pull target in a virtual reality environment, the interaction corresponding to a request to move towards the pull target. Operation 1904 represents, in response to the detecting the interaction, changing a user's perceived position in the virtual reality environment to be closer to the pull target.

Further operations can comprise detecting other interaction with the pull target, the other interaction corresponding to a request to move away from the pull target, and in response to the detecting the other interaction, changing the user's perceived position in the virtual reality environment to be further from to the pull target.

Changing the user's perceived position in the virtual reality environment to be further from to the pull target can comprise stopping at a starting point corresponding to where the user began interaction with the pull target.

Changing the user's perceived position in the virtual reality environment to be closer to the pull target can comprise using an easing function to gradually move the user into a stopping position. Changing the user's perceived position in the virtual reality environment to be closer to the pull target can comprise detecting a high velocity of change relative to the pull target, and in response to the detecting, blinking the user to a final position corresponding to arrival at the pull target.

Further operations can comprise detecting that the user is in a final position corresponding to arrival at the pull target, and in response to the detecting, removing a visual representation of the pull target.

Changing the user's perceived position in the virtual reality environment to be closer to the pull target can comprise rotating the user's position into a rotated position. Further operations can comprise blinking the user into the rotated position.

Figure 20:
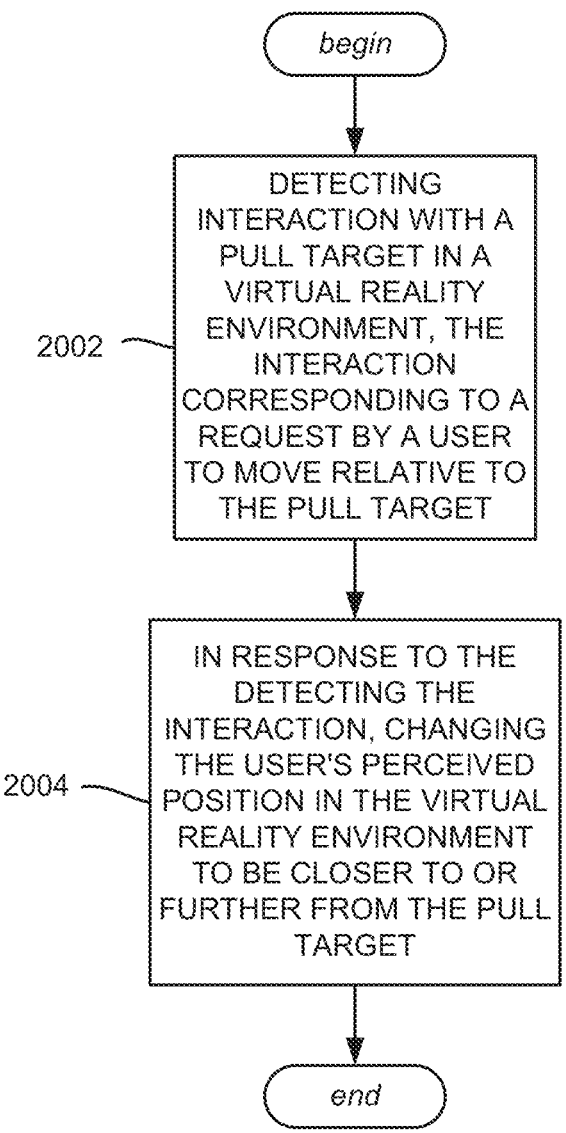
FIG. 20 is an example flow diagram showing example logic/operations related to detecting user interaction with respect to a pull target to change a user's position in a virtual reality environment, in accordance with various aspects and embodiments of the subject disclosure.

FIG. 20 summarizes various example operations, e.g., corresponding to executable instructions of a machine-readable storage medium, in which the executable instructions, when executed by a processor, facilitate performance of the example operations. Operation 2002 represents detecting interaction with a pull target in a virtual reality environment, the interaction corresponding to a request by a user to move relative to the pull target. Operation 2004 represents, in response to the detecting the interaction, changing the user's perceived position in the virtual reality environment to be closer to or further from the pull target.

Changing the user's perceived position can comprise using an easing function to gradually move the user into a stopping position.

Detecting the interaction with the pull target can comprise using detecting hand controller movement towards the user, and changing the user's perceived position can comprise using changing the user's perceived position to be closer to the pull target.

Further operations can comprise determining that the user's perceived position is within a threshold distance of the pull target, and in response to the determining, making the pull target disappear.

Detecting the interaction with the pull target can comprise detecting hand controller movement away from the user, and the changing the user's perceived position can comprise changing the user's perceived position to be further from the pull target.

As can be seen, described is pull locomotion based on pull targets presented in a virtual reality environment. Pull locomotion allows for gradually moving a user towards a pull target by pulling a controller towards a user, and conversely gradually moving a user away from pull target by pushing the controller. The pulling and pushing facilitate an interactive narrative experience and/or enhance interactive game play in a virtual reality environment.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 21:
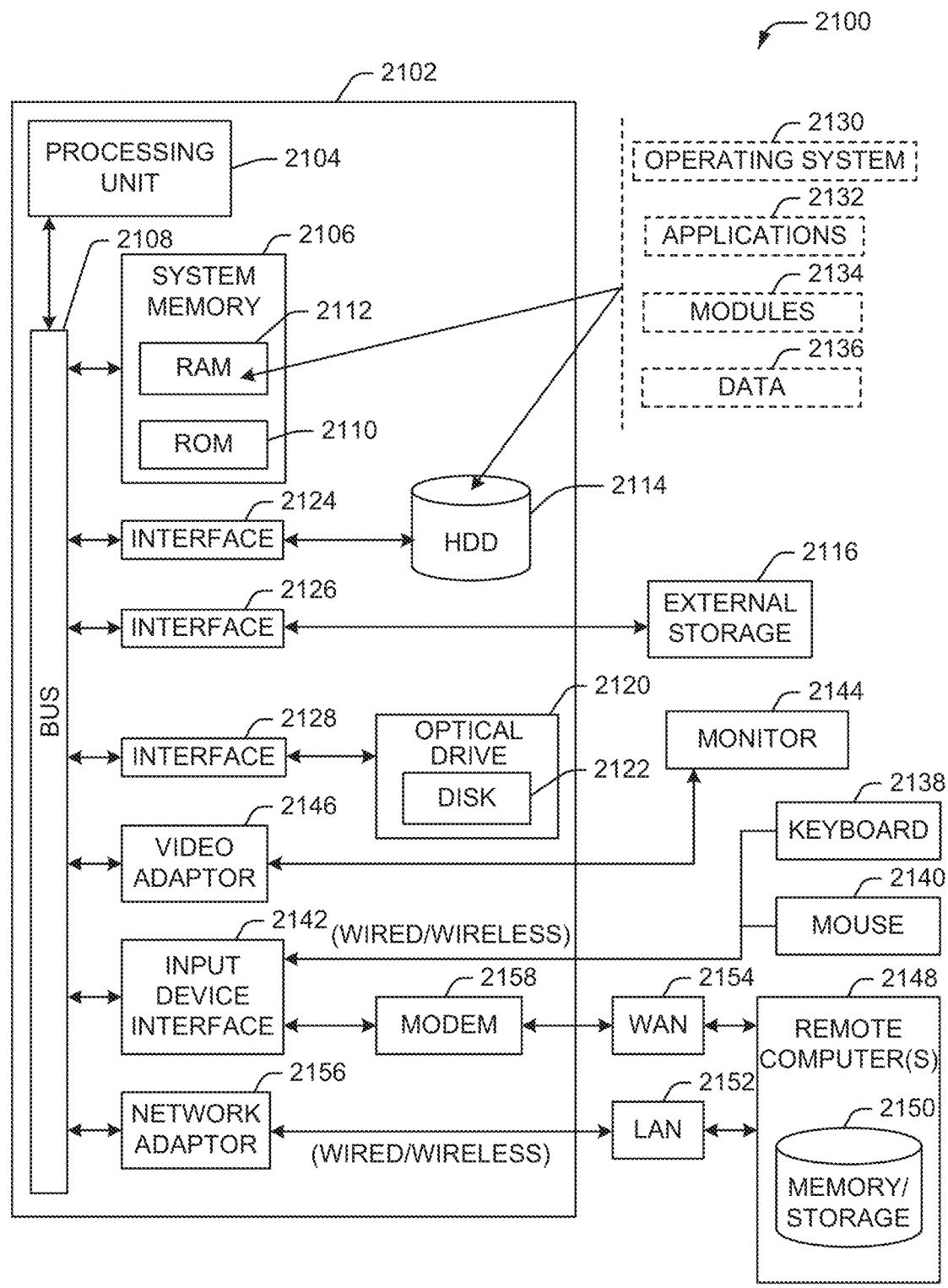
FIG. 21 illustrates an example block diagram of an example machine/computer operable to facilitate the exemplified components, logic and/or operations according to one or more embodiments described herein.

In order to provide additional context for various embodiments described herein, FIG. 21 and the following discussion are intended to provide a brief, general description of a suitable computing environment 2100 in which the various embodiments of the embodiment described herein can be implemented. While the embodiments have been described above in the general context of machine-executable/computer-executable instructions that can run on one or more machines/computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media and/or communications media, which two terms are used herein differently from one another as follows. Machine readable/computer-readable storage media can be any available storage media that can be accessed by a machine such as the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the aspects described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2114 (e.g., EIDE, SATA), one or more external storage devices 2116 (e.g., a magnetic floppy disk drive (FDD) 2116, a memory stick or flash drive reader, a memory card reader, etc.) and an optical disk drive 2120 (e.g., which can read or write from a CD-ROM disc, a DVD, a BD, etc.). While the internal HDD 2114 is illustrated as located within the computer 2102, the internal HDD 2114 can also be configured for external use in a suitable chassis (not shown). Additionally, while not shown in environment 2100, a solid state drive (SSD) could be used in addition to, or in place of, an HDD 2114. The HDD 2114, external storage device(s) 2116 and optical disk drive 2120 can be connected to the system bus 2108 by an HDD interface 2124, an external storage interface 2126 and an optical drive interface 2128, respectively. The interface 2124 for external drive implementations can include at least one or both of Universal Serial Bus (USB) and Institute of Electrical and Electronics Engineers (IEEE) interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. The systems and methods described herein can be implemented utilizing various commercially available operating systems or combinations of operating systems.

A user can enter commands and information into the computer 2102 through one or more wired/wireless input devices; e.g., a keyboard 2138 and a pointing device, such as a mouse 2140 are depicted, but it is understood that many other input devices can be used instead of or in addition to those depicted. For example, other input devices (not shown) can include a microphone, an infrared (IR)/radio frequency (RF) remote control, a joystick, a game pad, a hand controller, a camera, a gesture/motion detector device, a stylus pen, a touch screen or the like. These and other input devices are often connected to the processing unit 2104 through an input device interface 2142 that can be coupled to the system bus 2108, but can be connected by other interfaces, such as a parallel port, an IEEE 2194 serial port, a game port, a USB port, an IR interface, a BLUETOOTH® interface, etc.

A monitor 2144 or other type of display device (such as a virtual reality headset/goggles) can be also connected to the system bus 2108 via an interface, such as a video adapter 2146. In addition to the monitor 2144, a computer typically includes other peripheral output devices (not shown), such as speakers, printers, tactile feedback devices, etc.

The computer 2102 can operate in a networked environment using logical connections via wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2152 through a wired and/or wireless communication network interface or adapter 2156. The adapter 2156 can facilitate wired or wireless communication to the LAN 2152, which can also include a wireless access point (AP) disposed thereon for communicating with the adapter 2156 in a wireless mode.

When used in a WAN networking environment, the computer 2102 can include a modem 2158 or can be connected to a communications server on the WAN 2154 via other means for establishing communications over the WAN 2154, such as by way of the Internet. The modem 2158, which can be internal or external and a wired or wireless device, can be connected to the system bus 2108 via the input device interface 2142. In a networked environment, program modules depicted relative to the computer 2102 or portions thereof, can be stored in the remote memory/storage device 2150. It will be appreciated that the network connections shown are example and other means of establishing a communications link between the computers can be used.

When used in either a LAN or WAN networking environment, the computer 2102 can access cloud storage systems or other network-based storage systems in addition to, or in place of, external storage devices 2116 as described above. Generally, a connection between the computer 2102 and a cloud storage system can be established over a LAN 2152 or WAN 2154 e.g., by the adapter 2156 or modem 2158, respectively. Upon connecting the computer 2102 to an associated cloud storage system, the external storage interface 2126 can, with the aid of the adapter 2156 and/or modem 2158, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
scanning, by a virtual reality system comprising a processor, a relative world space to locate a pull target using a spherical ray trace function to obtain an array of hit objects, wherein the pull target deactivates when a hit object of the array of hit targets is within a minimum distance;
presenting, by the virtual reality system, the pull target in a virtual reality environment; and
moving, by the virtual reality system, a perceived position of a user in the virtual reality environment from a current position to an updated position, based on interaction with the pull target associated with movement of a controller device by the user at least meeting the minimum distance, wherein the moving comprises:
employing a helper spline for movement of the perceived position of the user along a path from the current position to the updated position, and
in response to the interaction with the pull target corresponding with a velocity of movement in the virtual reality environment exceeding a threshold velocity, performing a blink operation that immediately transports the perceived position from the current position to the updated position.

2. The method of claim 1, wherein the interaction with the pull target pulls the perceived position of the user from the current position towards the updated position.

3. The method of claim 1, wherein the interaction with the pull target pushes the perceived position of the user away from the current position towards the updated position.

4. The method of claim 1, wherein the interaction with the pull target initially accelerates the perceived position of the user toward the updated position.

5. The method of claim 1, further comprising, making, by the virtual reality system, the pull target disappear in response to determining that the updated position is within a threshold distance of the pull target.

6. The method of claim 1, further comprising:
calibrating, by the virtual reality system, the user specific maximum comfortable pull motion distance based on a physical pull action of the controller device performed by the user; and
customizing, by the virtual reality system for the user, the minimum pull distance of the controller device based on the user specific maximum comfortable pull motion distance of the user.

7. The method of claim 1, wherein the threshold velocity is based upon a threshold quantity of frames in which the perceived position of the user will arrive at the updated position.

8. A system, comprising:
a processor; and
a memory that stores executable instructions that, when executed by the processor, facilitate performance of operations, the operations comprising:
scanning a relative world space in a virtual reality environment to locate a pull target using a spherical ray trace function to obtain an array of hit objects, wherein the scanning is initiated by movement of a controller device along a two-dimensional vector;
detecting interaction with the pull target in the virtual reality environment, the interaction corresponding to a request by a user to move towards the pull target; and
in response to the detecting the interaction, and the interaction being associated with the movement of the controller device by the user at least meeting a minimum distance, changing a perceived position of the user in the virtual reality environment from a current position to an updated position closer to the pull target, wherein the changing comprises:
employing a helper spline for movement of the perceived position of the user along a path from the current position to the updated position, and
in response to the interaction with the pull target corresponding with a velocity of movement in the virtual reality environment exceeding a threshold velocity, performing a blink operation that transports the perceived position from the current position to the updated position without traversal through any intermediate positions between the current position and the updated position.

9. The system of claim 8, wherein the operations further comprise detecting other interaction with the pull target, the other interaction corresponding to another request to move away from the pull target, and in response to the detecting the other interaction, changing the perceived position of the user in the virtual reality environment to be further from to the pull target.

10. The system of claim 9, wherein the changing the perceived position of the user in the virtual reality environment to be further from to the pull target comprises stopping at a starting point corresponding to where the user began interaction with the pull target.

11. The system of claim 8, wherein the changing the perceived position of the user in the virtual reality environment initially accelerates the perceived position of the user toward the updated position.

12. The system of claim 8, wherein the operations further comprise detecting that the perceived position of the user is in a final position corresponding to arrival at the pull target, and in response to the detecting, removing a visual representation of the pull target.

13. The system of claim 8, wherein the changing the perceived position of the user in the virtual reality environment further comprises rotating the perceived position of the user into a rotated position.

14. The system of claim 13, wherein the operations further comprise blinking the perceived position of the user into the rotated position.

15. A machine-readable storage medium, comprising executable instructions that, when executed by a processor of a, facilitate performance of operations, the operations comprising:
scanning a relative world space in a virtual reality environment to locate a pull target using a spherical ray trace function to obtain an array of hit objects, wherein the scanning is initiated by movement of a controller device along a two-dimensional vector;
detecting interaction with the pull target in the virtual reality environment, the interaction corresponding to a request by a user to move relative to the pull target; and
in response to the detecting the interaction, and the interaction being associated with the movement of the controller device by the user at least meeting a minimum distance, changing a perceived position of the user in the virtual reality environment from a current position to an updated position relative to the pull target, wherein the changing comprises:
employing a helper spline for movement of the perceived position of the user along a path from the current position to the updated position, and
in response to the interaction with the pull target corresponding with a velocity of movement in the virtual reality environment exceeding a threshold velocity, performing a blink operation that instantaneously transports the perceived position of the user from the current position to the updated position.

16. The machine-readable storage medium of claim 15, wherein the updated position is closer to the pull target.

17. The machine-readable storage medium of claim 15, wherein the changing the perceived position of the user in the virtual reality environment initially accelerates the perceived position of the user toward the updated position the pull target.

18. The machine-readable storage medium of claim 17, wherein the operations further comprise determining that the perceived position of the user is within a threshold distance of the pull target, and in response to the determining, making the pull target disappear.

19. The machine-readable storage medium of claim 15, wherein the updated position is further from the pull target.

20. The machine-readable storage medium of claim 15, wherein the pull target is a first pull target, and the operations further comprise presenting a second pull target based on the updated position.

* * * * *